United States Patent
DeBie et al.

(10) Patent No.: US 11,978,114 B1
(45) Date of Patent: *May 7, 2024

(54) REPORT EXISTENCE MONITORING

(71) Applicant: ConsumerInfo.com, Inc., Costa Mesa, CA (US)

(72) Inventors: Tod DeBie, Costa Mesa, CA (US); Michael Burger, Rancho Santa Margarita, CA (US)

(73) Assignee: ConsumerInfo.com, Inc., Costa Mesa, CA (US)

( * ) Notice: Subject to any disclaimer, the term of this patent is extended or adjusted under 35 U.S.C. 154(b) by 339 days.

This patent is subject to a terminal disclaimer.

(21) Appl. No.: 17/156,423

(22) Filed: Jan. 22, 2021

Related U.S. Application Data

(63) Continuation of application No. 16/037,221, filed on Jul. 17, 2018, now Pat. No. 10,937,090, which is a continuation of application No. 12/349,455, filed on Jan. 6, 2009, now abandoned.

(51) Int. Cl.
*G06Q 40/02* (2023.01)
*G06Q 40/03* (2023.01)

(52) U.S. Cl.
CPC ............. *G06Q 40/03* (2023.01); *G06Q 40/02* (2013.01)

(58) Field of Classification Search
CPC .................................. G06Q 40/00–06
See application file for complete search history.

(56) References Cited

U.S. PATENT DOCUMENTS

| | | | |
|---|---|---|---|
| 3,316,395 A | 4/1967 | Lavin et al. | |
| 4,305,059 A | 12/1981 | Benton | |
| 4,578,530 A | 3/1986 | Zeidler | |
| 4,736,294 A | 4/1988 | Gill | |
| 4,774,664 A | 9/1988 | Campbell et al. | |
| 4,876,592 A | 10/1989 | Von Kohorn | |
| 4,891,503 A | 1/1990 | Jewell | |
| 4,895,518 A | 1/1990 | Arnold | |

(Continued)

FOREIGN PATENT DOCUMENTS

| | | |
|---|---|---|
| CA | 2 611 595 | 12/2006 |
| CN | 1290373 | 4/2001 |

(Continued)

OTHER PUBLICATIONS

U.S. Appl. No. 12/349,455, 2010/0174638, Report Existence Monitoring, filed Jan. 6, 2009.

(Continued)

*Primary Examiner* — Eric T Wong

(74) *Attorney, Agent, or Firm* — Knobbe, Martens, Olson & Bear, LLP

(57) ABSTRACT

Certain consumers may not have a credit report and, thus, may not be able to enroll in a credit monitoring service. A credit report monitoring system requests a credit report of consumers that are attempting to enroll in a credit monitoring service. If no credit report is located for the consumer, a credit report of the consumer is automatically periodically requested by the system. When a credit report is later located, the consumer may continue with enrollment in a credit report monitoring service. In this way, the consumer is alerted of the (possibly fraudulent) creation of a credit report and is quickly able to enroll in a credit monitoring service.

19 Claims, 7 Drawing Sheets

(56) References Cited

U.S. PATENT DOCUMENTS

| | | |
|---|---|---|
| 4,947,028 A | 8/1990 | Gorog |
| 5,013,038 A | 5/1991 | Luxenberg et al. |
| 5,025,138 A | 6/1991 | Cuervo |
| 5,025,373 A | 6/1991 | Keyser, Jr. et al. |
| 5,034,807 A | 7/1991 | Von Kohorn |
| 5,060,153 A | 10/1991 | Nakagawa |
| 5,148,365 A | 9/1992 | Dembo |
| 5,220,501 A | 6/1993 | Lawlor et al. |
| 5,239,462 A | 8/1993 | Jones et al. |
| 5,259,766 A | 11/1993 | Sack |
| 5,262,941 A | 11/1993 | Saladin |
| 5,274,547 A | 12/1993 | Zoffel et al. |
| 5,317,636 A | 5/1994 | Vizcaino |
| 5,317,733 A | 5/1994 | Murdock |
| 5,336,870 A | 8/1994 | Hughes et al. |
| 5,361,201 A | 11/1994 | Jost et al. |
| 5,504,675 A | 4/1996 | Cragun et al. |
| 5,521,813 A | 5/1996 | Fox et al. |
| 5,563,783 A | 10/1996 | Stolfo et al. |
| 5,583,763 A | 12/1996 | Atcheson et al. |
| 5,590,038 A | 12/1996 | Pitroda |
| 5,611,052 A | 3/1997 | Dykstra et al. |
| 5,615,408 A | 3/1997 | Johnson |
| 5,630,127 A | 5/1997 | Moore et al. |
| 5,640,577 A | 6/1997 | Scharmer |
| 5,659,725 A | 8/1997 | Levy et al. |
| 5,659,731 A | 8/1997 | Gustafson |
| 5,692,107 A | 11/1997 | Simoudis et al. |
| 5,696,907 A | 12/1997 | Tom |
| 5,699,527 A | 12/1997 | Davidson |
| 5,704,029 A | 12/1997 | Wright, Jr. |
| 5,708,422 A | 1/1998 | Blonder et al. |
| 5,732,400 A | 3/1998 | Mandler |
| 5,745,654 A | 4/1998 | Titan |
| 5,745,706 A | 4/1998 | Wolfberg et al. |
| 5,748,098 A | 5/1998 | Grace |
| 5,774,868 A | 6/1998 | Cragun et al. |
| 5,774,883 A | 6/1998 | Andersen |
| 5,793,972 A | 8/1998 | Shane |
| 5,802,142 A | 9/1998 | Browne |
| 5,819,226 A | 10/1998 | Gopinathan et al. |
| 5,844,218 A | 12/1998 | Kawan et al. |
| 5,857,174 A | 1/1999 | Dugan |
| 5,870,721 A | 2/1999 | Norris |
| 5,875,236 A | 2/1999 | Jankowitz |
| 5,878,403 A | 3/1999 | DeFrancesco |
| 5,884,287 A | 3/1999 | Edesess |
| 5,884,289 A | 3/1999 | Anderson et al. |
| 5,912,839 A | 6/1999 | Ovshinsky et al. |
| 5,914,472 A | 6/1999 | Foladare et al. |
| 5,918,217 A | 6/1999 | Maggioncalda et al. |
| 5,924,082 A | 7/1999 | Silverman et al. |
| 5,926,800 A | 7/1999 | Baronowski et al. |
| 5,930,764 A | 7/1999 | Melchione et al. |
| 5,930,776 A | 7/1999 | Dykstra et al. |
| 5,933,813 A | 8/1999 | Teicher et al. |
| 5,940,812 A | 8/1999 | Tengel et al. |
| 5,950,172 A | 9/1999 | Klingman |
| 5,953,707 A | 9/1999 | Huang et al. |
| 5,953,710 A | 9/1999 | Fleming |
| 5,956,693 A | 9/1999 | Geerlings |
| 5,966,695 A | 10/1999 | Melchione et al. |
| 5,978,780 A | 11/1999 | Watson |
| 5,991,411 A | 11/1999 | Kaufman et al. |
| 5,995,947 A | 11/1999 | Fraser et al. |
| 6,012,044 A | 1/2000 | Maggioncalda et al. |
| 6,014,645 A | 1/2000 | Cunningham |
| 6,021,397 A | 2/2000 | Jones et al. |
| 6,029,139 A | 2/2000 | Cunningham et al. |
| 6,029,149 A | 2/2000 | Dykstra et al. |
| 6,029,154 A | 2/2000 | Pettitt |
| 6,029,178 A | 2/2000 | Martin et al. |
| 6,038,551 A | 3/2000 | Barlow et al. |
| 6,044,357 A | 3/2000 | Garg |
| 6,055,570 A | 4/2000 | Nielsen |
| 6,064,987 A | 5/2000 | Walker |
| 6,070,141 A | 5/2000 | Houvener |
| 6,070,147 A | 5/2000 | Harms et al. |
| 6,073,140 A | 6/2000 | Morgan et al. |
| 6,078,922 A | 6/2000 | Johnson et al. |
| 6,088,686 A | 7/2000 | Walker et al. |
| 6,094,643 A | 7/2000 | Anderson et al. |
| 6,098,052 A | 8/2000 | Kosiba et al. |
| 6,105,007 A | 8/2000 | Norris |
| 6,115,690 A | 9/2000 | Wong |
| 6,115,694 A | 9/2000 | Cheetham et al. |
| 6,119,103 A | 9/2000 | Basch et al. |
| 6,128,599 A | 10/2000 | Walker |
| 6,128,603 A | 10/2000 | Dent |
| 6,154,729 A | 11/2000 | Cannon et al. |
| 6,182,229 B1 | 1/2001 | Nielsen |
| 6,185,543 B1 | 2/2001 | Galperin et al. |
| 6,199,077 B1 | 3/2001 | Inala et al. |
| 6,202,053 B1 | 3/2001 | Christiansen et al. |
| 6,249,770 B1 | 6/2001 | Erwin et al. |
| 6,253,203 B1 | 6/2001 | O'Flaherty et al. |
| 6,269,325 B1 | 7/2001 | Lee et al. |
| 6,275,824 B1 | 8/2001 | O'Flaherty et al. |
| 6,285,987 B1 | 9/2001 | Roth et al. |
| 6,298,348 B1 | 10/2001 | Eldering |
| 6,304,860 B1 | 10/2001 | Martin et al. |
| 6,311,169 B2 | 10/2001 | Duhon |
| 6,317,783 B1 | 11/2001 | Freishtat et al. |
| 6,321,205 B1 | 11/2001 | Eder |
| 6,324,524 B1 | 11/2001 | Lent et al. |
| 6,330,546 B1 | 12/2001 | Gopinathan et al. |
| 6,330,575 B1 | 12/2001 | Moore et al. |
| 6,339,790 B1 | 1/2002 | Inoue |
| 6,374,264 B1 | 4/2002 | Bohannon et al. |
| 6,384,844 B1 | 5/2002 | Stewart et al. |
| 6,385,594 B1 | 5/2002 | Lebda et al. |
| 6,393,406 B1 | 5/2002 | Eder |
| 6,397,224 B1 | 5/2002 | Zubeldia et al. |
| 6,405,173 B1 | 6/2002 | Honarvar |
| 6,405,181 B2 | 6/2002 | Lent et al. |
| 6,418,436 B1 | 7/2002 | Degen et al. |
| 6,424,956 B1 | 7/2002 | Werbos |
| 6,430,539 B1 | 8/2002 | Lazarus et al. |
| 6,477,509 B1 | 11/2002 | Hammons et al. |
| 6,487,540 B1 | 11/2002 | Smith et al. |
| 5,870,721 C1 | 1/2003 | Norris |
| 6,513,018 B1 | 1/2003 | Culhane |
| 6,523,041 B1 | 2/2003 | Morgan et al. |
| 6,529,880 B1 | 3/2003 | McKeen et al. |
| 6,532,450 B1 | 3/2003 | Brown et al. |
| 6,542,894 B1 | 4/2003 | Lee et al. |
| 6,556,979 B1 | 4/2003 | Liu et al. |
| 6,567,791 B2 | 5/2003 | Lent et al. |
| 6,581,075 B1 | 6/2003 | Guturu et al. |
| 6,597,775 B2 | 7/2003 | Lawyer et al. |
| 6,611,816 B2 | 8/2003 | Lebda et al. |
| 6,615,193 B1 | 9/2003 | Kingdon et al. |
| 6,622,131 B1 | 9/2003 | Brown et al. |
| 6,622,266 B1 | 9/2003 | Goddard et al. |
| 6,629,245 B1 | 9/2003 | Stone et al. |
| 6,636,803 B1 | 10/2003 | Hartz, Jr. et al. |
| 6,658,393 B1 | 12/2003 | Basch et al. |
| 6,714,918 B2 | 3/2004 | Hillmer et al. |
| 6,748,426 B1 | 6/2004 | Shaffer et al. |
| 6,782,390 B2 | 8/2004 | Lee et al. |
| 6,804,346 B1 | 10/2004 | Mewhinney |
| 6,805,287 B2 | 10/2004 | Bishop et al. |
| 6,823,319 B1 | 11/2004 | Lynch et al. |
| 6,832,229 B2 | 12/2004 | Reed |
| 6,839,682 B1 | 1/2005 | Blume et al. |
| 6,839,690 B1 | 1/2005 | Foth et al. |
| 6,842,782 B1 | 1/2005 | Malik et al. |
| 6,850,606 B2 | 2/2005 | Lawyer et al. |
| 6,873,972 B1 | 3/2005 | Marcial et al. |
| 6,873,979 B2 | 3/2005 | Fishman et al. |
| 6,901,406 B2 | 5/2005 | Nabe et al. |
| 6,910,624 B1 | 6/2005 | Natsuno |
| 6,912,483 B2 | 6/2005 | Frederick |
| 6,950,807 B2 | 9/2005 | Brock |

(56) References Cited

U.S. PATENT DOCUMENTS

| | | |
|---|---|---|
| 6,962,336 B2 | 11/2005 | Glass |
| 6,985,887 B1 | 1/2006 | Sunstein et al. |
| 6,988,085 B2 | 1/2006 | Hedy |
| 6,993,510 B2 | 1/2006 | Guy et al. |
| 7,003,476 B1 | 2/2006 | Samra et al. |
| 7,013,310 B2 | 3/2006 | Messing et al. |
| 7,016,870 B1 | 3/2006 | Jones et al. |
| 7,028,052 B2 | 4/2006 | Chapman et al. |
| 7,058,817 B1 | 6/2006 | Ellmore |
| 7,062,458 B2 | 6/2006 | Maggioncalda et al. |
| 7,065,566 B2 | 6/2006 | Menard et al. |
| 7,069,249 B2 | 6/2006 | Stolfo et al. |
| 7,076,462 B1 | 7/2006 | Nelson et al. |
| 7,076,475 B2 | 7/2006 | Honarvar et al. |
| 7,083,087 B1 | 8/2006 | Gangi |
| 7,107,249 B2 | 9/2006 | Dively et al. |
| 7,117,172 B1 | 10/2006 | Black |
| 7,120,599 B2 | 10/2006 | Keyes |
| 7,143,063 B2 | 11/2006 | Lent |
| 7,165,037 B2 | 1/2007 | Lazarus et al. |
| 7,213,064 B2 | 5/2007 | Smith et al. |
| 7,229,006 B2 | 6/2007 | Babbi et al. |
| 7,240,059 B2 | 7/2007 | Bayliss et al. |
| 7,243,075 B1 | 7/2007 | Shaffer et al. |
| 7,249,076 B1 | 7/2007 | Pendleton et al. |
| 7,254,558 B2 | 8/2007 | Hinkle et al. |
| 7,263,497 B1 | 8/2007 | Wiser et al. |
| 7,263,506 B2 | 8/2007 | Lee et al. |
| 7,277,875 B2 | 10/2007 | Serrano-Morales et al. |
| 7,280,980 B1 | 10/2007 | Hoadley et al. |
| 7,280,983 B2 | 10/2007 | Kuroda et al. |
| 7,296,734 B2 | 11/2007 | Pliha |
| 7,302,420 B2 | 11/2007 | Aggarwal et al. |
| 7,308,417 B1 | 12/2007 | Nathan |
| 7,314,166 B2 | 1/2008 | Anderson et al. |
| 7,318,224 B2 | 1/2008 | Honarvar et al. |
| 7,330,835 B2 | 2/2008 | Deggendorf |
| 7,333,635 B2 | 2/2008 | Tsantes et al. |
| 7,333,937 B2 | 2/2008 | Baldwin, Jr. et al. |
| 7,337,133 B1 | 2/2008 | Bezos et al. |
| 7,337,468 B2 | 2/2008 | Metzger |
| 7,356,503 B1 | 4/2008 | Johnson et al. |
| 7,366,694 B2 | 4/2008 | Lazerson |
| 7,370,044 B2 | 5/2008 | Mulhern et al. |
| 7,376,603 B1 | 5/2008 | Mayr et al. |
| 7,383,215 B1 | 6/2008 | Navarro et al. |
| 7,383,988 B2 | 6/2008 | Slonecker, Jr. |
| 7,386,466 B2 | 6/2008 | McLean et al. |
| 7,395,232 B1 | 7/2008 | Pilato |
| 7,403,919 B2 | 7/2008 | Chacko et al. |
| 7,403,942 B1 | 7/2008 | Bayliss |
| 7,409,369 B1 | 8/2008 | Homuth et al. |
| 7,418,417 B2 | 8/2008 | Chacko et al. |
| 7,428,509 B2 | 9/2008 | Klebanoff |
| 7,433,855 B2 | 10/2008 | Gavan et al. |
| 7,451,095 B1 | 11/2008 | Bradley et al. |
| 7,464,067 B2 | 12/2008 | Chestnut |
| 7,479,949 B2 | 1/2009 | Jobs et al. |
| 7,480,631 B1 | 1/2009 | Merced et al. |
| 7,505,939 B2 | 3/2009 | Lent et al. |
| 7,529,698 B2 | 5/2009 | Joao |
| 7,542,993 B2 | 6/2009 | Satterfield et al. |
| 7,546,266 B2 | 6/2009 | Beirne et al. |
| 7,552,086 B1 | 6/2009 | Rajasekar et al. |
| 7,559,217 B2 | 7/2009 | Bass |
| 7,580,884 B2 | 8/2009 | Cook |
| 7,584,146 B1 | 9/2009 | Duhon |
| 7,593,891 B2 | 9/2009 | Kornegay et al. |
| 7,593,892 B2 | 9/2009 | Balk et al. |
| 7,596,512 B1 | 9/2009 | Raines et al. |
| 7,596,716 B2 | 9/2009 | Frost et al. |
| 7,603,317 B2 | 10/2009 | Adler et al. |
| 7,610,229 B1 | 10/2009 | Kornegay |
| 7,620,592 B1 | 11/2009 | O'Mara et al. |
| 7,624,068 B1 | 11/2009 | Heasley et al. |
| 7,630,932 B2 | 12/2009 | Danaher et al. |
| 7,653,592 B1 | 1/2010 | Flaxman et al. |
| 7,653,593 B2 | 1/2010 | Zarikian et al. |
| 7,668,769 B2 | 2/2010 | Baker et al. |
| 7,668,840 B2 | 2/2010 | Bayliss et al. |
| 7,672,833 B2 | 3/2010 | Blume et al. |
| 7,672,865 B2 | 3/2010 | Kumar et al. |
| 7,676,418 B1 | 3/2010 | Chung et al. |
| 7,689,451 B2 | 3/2010 | Vives |
| 7,689,505 B2 | 3/2010 | Kasower |
| 7,689,506 B2 | 3/2010 | Fei et al. |
| 7,708,196 B2 | 5/2010 | Palmieri et al. |
| 7,711,635 B2 | 5/2010 | Steele et al. |
| 7,711,636 B2 | 5/2010 | Robida et al. |
| 7,720,750 B2 | 5/2010 | Brody |
| 7,729,983 B1 | 6/2010 | Ellis |
| 7,734,522 B2 | 6/2010 | Johnson et al. |
| 7,756,789 B2 | 7/2010 | Welker et al. |
| 7,769,657 B2 | 8/2010 | Chacko et al. |
| 7,774,257 B2 | 8/2010 | Maggioncalda et al. |
| 7,774,270 B1 | 8/2010 | MacCloskey |
| 7,788,147 B2 | 8/2010 | Haggerty et al. |
| 7,788,152 B2 | 8/2010 | Haggerty et al. |
| 7,788,155 B2 | 8/2010 | Jones et al. |
| 7,792,715 B1 | 9/2010 | Kasower |
| 7,792,716 B2 | 9/2010 | Gooding et al. |
| 7,792,732 B2 | 9/2010 | Haggerty et al. |
| 7,797,734 B2 | 9/2010 | Babi et al. |
| 7,801,812 B2 | 9/2010 | Conlin et al. |
| 7,814,004 B2 | 10/2010 | Haggerty et al. |
| 7,814,005 B2 | 10/2010 | Imrey et al. |
| 7,818,228 B1 | 10/2010 | Coulter |
| 7,818,229 B2 | 10/2010 | Imrey et al. |
| 7,835,983 B2 | 11/2010 | Lefner et al. |
| 7,836,111 B1 | 11/2010 | Shan |
| 7,840,484 B2 | 11/2010 | Haggerty et al. |
| 7,841,004 B1 * | 11/2010 | Balducci ............... G06Q 20/02 455/410 |
| 7,849,004 B2 | 12/2010 | Choudhuri et al. |
| 7,853,998 B2 | 12/2010 | Blaisdell et al. |
| 7,860,782 B2 | 12/2010 | Cash et al. |
| 7,873,677 B2 | 1/2011 | Messing et al. |
| 7,877,304 B1 | 1/2011 | Coulter |
| 7,890,420 B2 | 2/2011 | Haggerty et al. |
| 7,900,052 B2 | 3/2011 | Joans |
| 7,904,306 B2 | 3/2011 | Johnson et al. |
| 7,904,367 B2 | 3/2011 | Chung et al. |
| 7,908,242 B1 | 3/2011 | Achanta |
| 7,912,770 B2 | 3/2011 | Haggerty et al. |
| 7,912,842 B1 | 3/2011 | Bayliss et al. |
| 7,912,865 B2 | 3/2011 | Akerman et al. |
| 7,925,578 B1 | 4/2011 | Hong et al. |
| 7,925,582 B1 | 4/2011 | Kornegay et al. |
| 7,930,252 B2 | 4/2011 | Bender et al. |
| 7,937,416 B2 | 5/2011 | Hossfeld et al. |
| 7,941,365 B1 | 5/2011 | Bradley et al. |
| 7,945,510 B1 | 5/2011 | Bradley et al. |
| 7,953,213 B2 | 5/2011 | Babi et al. |
| 7,966,255 B2 | 6/2011 | Wong et al. |
| 7,970,676 B2 | 6/2011 | Feinstein |
| 7,970,679 B2 | 6/2011 | Kasower |
| 7,970,698 B2 | 6/2011 | Gupta et al. |
| 7,974,919 B2 | 7/2011 | Conlin et al. |
| 7,975,299 B1 | 7/2011 | Balducci et al. |
| 7,983,975 B2 | 7/2011 | Jones et al. |
| 7,987,124 B1 | 7/2011 | Holden et al. |
| 8,001,034 B2 | 8/2011 | Chung et al. |
| 8,001,041 B2 | 8/2011 | Hoadley et al. |
| 8,005,738 B2 | 8/2011 | Chacko et al. |
| 8,005,759 B2 | 8/2011 | Hirtenstein et al. |
| 8,005,795 B2 | 8/2011 | Galipeau et al. |
| 8,015,107 B2 | 9/2011 | Kornegay et al. |
| 8,024,263 B2 | 9/2011 | Zarikian et al. |
| 8,024,778 B2 | 9/2011 | Cash et al. |
| 8,032,932 B2 | 10/2011 | Speyer et al. |
| 8,055,579 B2 | 11/2011 | Davies et al. |
| 8,060,424 B2 | 11/2011 | Kasower |
| 8,073,768 B2 | 12/2011 | Haggerty et al. |
| 8,078,524 B2 | 12/2011 | Crawford et al. |

(56) References Cited

U.S. PATENT DOCUMENTS

| | | |
|---|---|---|
| 8,078,527 B2 | 12/2011 | Cerise et al. |
| 8,086,523 B1 | 12/2011 | Palmer |
| 8,095,458 B2 | 1/2012 | Peterson et al. |
| 8,099,356 B2 | 1/2012 | Feinstein et al. |
| 8,131,614 B2 | 3/2012 | Haggerty et al. |
| 8,160,960 B1 | 4/2012 | Fei et al. |
| 8,165,940 B2 | 4/2012 | Meimes et al. |
| 8,165,962 B1 | 4/2012 | LeKachman |
| 8,195,549 B2 | 6/2012 | Kasower |
| 8,204,774 B2 | 6/2012 | Chwast et al. |
| 8,204,812 B2 | 6/2012 | Stewart et al. |
| 8,225,395 B2 | 7/2012 | Atwood et al. |
| 8,234,498 B2 | 7/2012 | Britti et al. |
| 8,255,971 B1 | 8/2012 | Webb et al. |
| 8,260,699 B2 | 9/2012 | Smith et al. |
| 8,285,613 B1 | 10/2012 | Coulter |
| 8,290,840 B2 | 10/2012 | Kasower |
| 8,311,936 B2 | 11/2012 | Haggerty et al. |
| 8,315,942 B2 | 11/2012 | Haggerty et al. |
| 8,321,334 B1 | 11/2012 | Kornegay et al. |
| 8,321,339 B2 | 11/2012 | Imrey et al. |
| 8,327,429 B2 | 12/2012 | Speyer et al. |
| 8,335,741 B2 | 12/2012 | Kornegay et al. |
| 8,347,364 B2 | 1/2013 | Babi et al. |
| 8,359,278 B2 | 1/2013 | Domenikos et al. |
| 8,386,377 B1 | 2/2013 | Xiong et al. |
| 8,392,334 B2 | 3/2013 | Hirtenstein et al. |
| 8,463,595 B1 | 6/2013 | Rehling et al. |
| 8,473,353 B2 | 6/2013 | Matsuda et al. |
| 8,478,686 B1 | 7/2013 | Giles |
| 8,489,502 B2 | 7/2013 | Morris et al. |
| 8,490,197 B2 | 7/2013 | Herz |
| 8,515,844 B2 | 8/2013 | Kasower |
| 8,527,596 B2 | 9/2013 | Long et al. |
| 8,533,118 B2 | 9/2013 | Weller et al. |
| 8,543,498 B2 | 9/2013 | Silbernagel et al. |
| 8,560,161 B1 | 10/2013 | Kator et al. |
| 8,560,436 B2 | 10/2013 | Ingram et al. |
| 8,571,971 B1 | 10/2013 | Brown et al. |
| 8,572,083 B1 | 10/2013 | Snell et al. |
| 8,589,286 B1 | 11/2013 | Kornegay et al. |
| 8,595,101 B1 | 11/2013 | Daukas et al. |
| 8,600,886 B2 | 12/2013 | Ramavarjula et al. |
| 8,606,694 B2 | 12/2013 | Campbell et al. |
| 8,660,919 B2 | 2/2014 | Kasower |
| 8,694,420 B1 | 4/2014 | Oliai |
| 8,712,907 B1 | 4/2014 | Stibel et al. |
| 8,725,613 B1 | 5/2014 | Celka et al. |
| 8,732,004 B1 | 5/2014 | Ramos et al. |
| 8,738,516 B1 | 5/2014 | Dean et al. |
| 8,744,956 B1 | 6/2014 | DiChiara et al. |
| 8,760,417 B2 | 6/2014 | Haug |
| 8,762,243 B2 | 6/2014 | Jenkins et al. |
| 8,775,299 B2 | 7/2014 | Achanta et al. |
| 8,781,951 B2 | 7/2014 | Lewis et al. |
| 8,781,953 B2 | 7/2014 | Kasower |
| 8,781,975 B2 | 7/2014 | Bennett et al. |
| 8,856,894 B1 | 10/2014 | Dean et al. |
| 8,930,216 B1 | 1/2015 | Johnson et al. |
| 8,930,263 B1 | 1/2015 | Mahacek et al. |
| 8,930,383 B2 | 1/2015 | Dekker et al. |
| 8,983,867 B2 | 3/2015 | Stibel et al. |
| 8,996,391 B2 | 3/2015 | Stibel et al. |
| 9,015,171 B2 | 4/2015 | Bayliss |
| 9,053,589 B1 | 6/2015 | Kator et al. |
| 9,053,590 B1 | 6/2015 | Kator et al. |
| 9,058,627 B1 | 6/2015 | Wasser et al. |
| 9,076,276 B1 | 7/2015 | Kator et al. |
| 9,092,616 B2 | 7/2015 | Kumar et al. |
| 9,116,918 B1 | 8/2015 | Kim |
| 9,213,461 B2 | 12/2015 | Eraker et al. |
| 9,256,904 B1 | 2/2016 | Haller et al. |
| 9,348,896 B2 | 5/2016 | Faith et al. |
| 9,443,268 B1 | 9/2016 | Kapczynski et al. |
| 9,449,346 B1 | 9/2016 | Hockey et al. |
| 9,558,519 B1 | 1/2017 | Burger |
| 9,569,797 B1 | 2/2017 | Rohn et al. |
| 9,595,023 B1 | 3/2017 | Hockey et al. |
| 9,607,336 B1 | 3/2017 | Dean et al. |
| 9,690,820 B1 | 6/2017 | Girulat, Jr. |
| 9,710,852 B1 | 7/2017 | Olson et al. |
| 9,824,199 B2 | 11/2017 | Kshirsagar et al. |
| 9,892,457 B1 | 2/2018 | Kapczynski |
| 10,003,591 B2 | 6/2018 | Hockey et al. |
| 10,104,059 B2 | 10/2018 | Hockey et al. |
| 10,319,029 B1 | 6/2019 | Hockey et al. |
| 10,380,654 B2 | 8/2019 | Hirtenstein et al. |
| 10,523,653 B2 | 12/2019 | Hockey et al. |
| 10,528,545 B1 | 1/2020 | Girulat, Jr. |
| 10,530,761 B2 | 1/2020 | Hockey et al. |
| 10,565,643 B2 | 2/2020 | Rohn et al. |
| 10,586,279 B1 | 3/2020 | Ramos et al. |
| 10,614,463 B1 | 4/2020 | Hockey et al. |
| 10,671,749 B2 | 6/2020 | Felice-Steele et al. |
| 10,726,491 B1 | 7/2020 | Hockey et al. |
| 10,757,154 B1 | 8/2020 | Jacobs et al. |
| 10,798,113 B2 | 10/2020 | Muddu et al. |
| 10,880,313 B2 | 12/2020 | Manna et al. |
| 10,937,090 B1 * | 3/2021 | DeBie ................ G06Q 40/03 |
| 10,949,428 B2 | 3/2021 | Poirel et al. |
| 11,025,629 B2 | 6/2021 | Chasman et al. |
| 11,025,638 B2 | 6/2021 | Ford et al. |
| 11,050,767 B2 | 6/2021 | Black et al. |
| 11,157,997 B2 | 10/2021 | Robida et al. |
| 11,159,593 B1 | 10/2021 | Jacobs et al. |
| 11,265,324 B2 | 3/2022 | Felice-Steele et al. |
| 11,347,715 B2 | 5/2022 | Girulat, Jr. |
| 11,373,261 B1 | 6/2022 | Ramos et al. |
| 11,399,029 B2 | 7/2022 | Manna et al. |
| 11,410,230 B1 | 8/2022 | Olson et al. |
| 11,562,457 B2 | 1/2023 | Ramos et al. |
| 2001/0011247 A1 | 8/2001 | O'Flaherty et al. |
| 2001/0027413 A1 | 10/2001 | Bhutta |
| 2001/0039523 A1 | 11/2001 | Iwamoto |
| 2001/0042785 A1 | 11/2001 | Walker et al. |
| 2001/0047307 A1 | 11/2001 | Bennett et al. |
| 2001/0049672 A1 | 12/2001 | Moore et al. |
| 2002/0032635 A1 | 3/2002 | Harris et al. |
| 2002/0032645 A1 | 3/2002 | Nozaki et al. |
| 2002/0032647 A1 | 3/2002 | Delinsky et al. |
| 2002/0035511 A1 | 3/2002 | Haji et al. |
| 2002/0035520 A1 | 3/2002 | Weiss |
| 2002/0049624 A1 | 4/2002 | Raveis, Jr. |
| 2002/0052836 A1 | 5/2002 | Galperin et al. |
| 2002/0069122 A1 | 6/2002 | Yun et al. |
| 2002/0077964 A1 * | 6/2002 | Brody ................ G06Q 40/08 |
| | | 705/38 |
| 2002/0087460 A1 | 7/2002 | Hornung |
| 2002/0091650 A1 | 7/2002 | Ellis |
| 2002/0099641 A1 | 7/2002 | Mills et al. |
| 2002/0099649 A1 | 7/2002 | Lee et al. |
| 2002/0099824 A1 | 7/2002 | Bender et al. |
| 2002/0107765 A1 | 8/2002 | Walker |
| 2002/0111890 A1 | 8/2002 | Sloan et al. |
| 2002/0128962 A1 | 9/2002 | Kasower |
| 2002/0147669 A1 | 10/2002 | Taylor et al. |
| 2002/0147695 A1 | 10/2002 | Khedkar et al. |
| 2002/0161711 A1 | 10/2002 | Sartor et al. |
| 2002/0165757 A1 | 11/2002 | Lisser |
| 2002/0165839 A1 | 11/2002 | Taylor et al. |
| 2002/0169747 A1 * | 11/2002 | Chapman ........... G06Q 30/0283 |
| 2002/0174124 A1 | 11/2002 | Haas et al. |
| 2002/0178146 A1 | 11/2002 | Akella et al. |
| 2002/0194117 A1 | 12/2002 | Nabe et al. |
| 2002/0198736 A1 | 12/2002 | Harrison |
| 2002/0198806 A1 | 12/2002 | Blagg et al. |
| 2002/0198824 A1 | 12/2002 | Cook |
| 2003/0009415 A1 | 1/2003 | Lutnick et al. |
| 2003/0009418 A1 | 1/2003 | Green et al. |
| 2003/0009426 A1 | 1/2003 | Ruiz-Sanchez |
| 2003/0018549 A1 | 1/2003 | Fei et al. |
| 2003/0028477 A1 | 2/2003 | Stevenson et al. |
| 2003/0033231 A1 | 2/2003 | Turner et al. |
| 2003/0041021 A1 | 2/2003 | Kogler et al. |

(56) References Cited

U.S. PATENT DOCUMENTS

| | | |
|---|---|---|
| 2003/0041031 A1 | 2/2003 | Hedy |
| 2003/0046222 A1 | 3/2003 | Bard et al. |
| 2003/0046223 A1 | 3/2003 | Crawford et al. |
| 2003/0064705 A1 | 4/2003 | Desierio |
| 2003/0065563 A1 | 4/2003 | Elliott et al. |
| 2003/0078897 A1 | 4/2003 | Florance et al. |
| 2003/0097320 A1 | 5/2003 | Gordon |
| 2003/0097329 A1 | 5/2003 | Nabe et al. |
| 2003/0097380 A1 | 5/2003 | Mulhern et al. |
| 2003/0101111 A1 | 5/2003 | Dang et al. |
| 2003/0115122 A1 | 6/2003 | Slater et al. |
| 2003/0144907 A1 | 7/2003 | Cohen, Jr. et al. |
| 2003/0144933 A1 | 7/2003 | Huang |
| 2003/0149659 A1 | 8/2003 | Danaher et al. |
| 2003/0154162 A1 | 8/2003 | Danaher et al. |
| 2003/0158751 A1 | 8/2003 | Suresh et al. |
| 2003/0158960 A1 | 8/2003 | Engberg |
| 2003/0163435 A1 | 8/2003 | Payone |
| 2003/0171942 A1 | 9/2003 | Gaito |
| 2003/0172039 A1 | 9/2003 | Guy |
| 2003/0177091 A1 | 9/2003 | Paglin |
| 2003/0182214 A1 | 9/2003 | Taylor |
| 2003/0187780 A1 | 10/2003 | Arthus et al. |
| 2003/0195830 A1 | 10/2003 | Merkoulovitch et al. |
| 2003/0204752 A1 | 10/2003 | Garrison |
| 2003/0212618 A1 | 11/2003 | Keyes et al. |
| 2003/0217003 A1 | 11/2003 | Weinflash et al. |
| 2003/0225692 A1 | 12/2003 | Bosch et al. |
| 2003/0225729 A1 | 12/2003 | Maloche et al. |
| 2003/0229580 A1 | 12/2003 | Gass et al. |
| 2003/0236738 A1 | 12/2003 | Lange et al. |
| 2004/0006536 A1 | 1/2004 | Kawashima et al. |
| 2004/0023637 A1 | 2/2004 | Johnson et al. |
| 2004/0030621 A1 | 2/2004 | Cobb |
| 2004/0030629 A1 | 2/2004 | Freeman et al. |
| 2004/0030649 A1 | 2/2004 | Nelson et al. |
| 2004/0030667 A1 | 2/2004 | Xu et al. |
| 2004/0039686 A1 | 2/2004 | Klebanoff |
| 2004/0039688 A1 | 2/2004 | Sulkowski et al. |
| 2004/0044615 A1 | 3/2004 | Xue et al. |
| 2004/0044617 A1 | 3/2004 | Lu |
| 2004/0054619 A1 | 3/2004 | Watson et al. |
| 2004/0107132 A1 | 6/2004 | Honarvar et al. |
| 2004/0111292 A1 | 6/2004 | Hutchins |
| 2004/0111358 A1 | 6/2004 | Lange et al. |
| 2004/0111359 A1 | 6/2004 | Hudock |
| 2004/0111363 A1 | 6/2004 | Trench et al. |
| 2004/0117302 A1 | 6/2004 | Weichert et al. |
| 2004/0133460 A1 | 7/2004 | Berlin et al. |
| 2004/0133493 A1 | 7/2004 | Ford et al. |
| 2004/0138935 A1 | 7/2004 | Johnson et al. |
| 2004/0138995 A1 | 7/2004 | Hershkowitz et al. |
| 2004/0143546 A1 | 7/2004 | Wood et al. |
| 2004/0153437 A1 | 8/2004 | Buchan |
| 2004/0158521 A1 | 8/2004 | Newton |
| 2004/0158723 A1 | 8/2004 | Root |
| 2004/0159700 A1 | 8/2004 | Khan et al. |
| 2004/0177030 A1 | 9/2004 | Shoham |
| 2004/0177046 A1 | 9/2004 | Ogram |
| 2004/0186807 A1 | 9/2004 | Nathans et al. |
| 2004/0193535 A1 | 9/2004 | Barazesh |
| 2004/0199456 A1 | 10/2004 | Flint et al. |
| 2004/0215584 A1 | 10/2004 | Yao |
| 2004/0230448 A1 | 11/2004 | Schaich |
| 2004/0243450 A1 | 12/2004 | Bernard, Jr. et al. |
| 2004/0243506 A1 | 12/2004 | Das |
| 2004/0243518 A1 | 12/2004 | Clifton et al. |
| 2004/0249532 A1 | 12/2004 | Kelly et al. |
| 2004/0255127 A1 | 12/2004 | Arnouse |
| 2005/0004855 A1 | 1/2005 | Jenson et al. |
| 2005/0010513 A1 | 1/2005 | Duckworth et al. |
| 2005/0021476 A1 | 1/2005 | Candella et al. |
| 2005/0027632 A1 | 2/2005 | Zeitoun et al. |
| 2005/0027633 A1 | 2/2005 | Fortuna et al. |
| 2005/0055275 A1 | 3/2005 | Newman et al. |
| 2005/0065874 A1 | 3/2005 | Lefner et al. |
| 2005/0080697 A1 | 4/2005 | Foss et al. |
| 2005/0080716 A1 | 4/2005 | Belyi et al. |
| 2005/0080821 A1 | 4/2005 | Breil et al. |
| 2005/0086126 A1 | 4/2005 | Patterson |
| 2005/0086176 A1 | 4/2005 | Dahlgren |
| 2005/0096950 A1 | 5/2005 | Caplan et al. |
| 2005/0097017 A1 | 5/2005 | Hanratty |
| 2005/0097039 A1 | 5/2005 | Kulcsar et al. |
| 2005/0097320 A1 | 5/2005 | Golan et al. |
| 2005/0102226 A1 | 5/2005 | Oppenheimer et al. |
| 2005/0105719 A1 | 5/2005 | Huda |
| 2005/0125291 A1 | 6/2005 | Demkiw Grayson et al. |
| 2005/0125350 A1 | 6/2005 | Tidwell et al. |
| 2005/0125686 A1 | 6/2005 | Brandt |
| 2005/0130704 A1 | 6/2005 | McParland et al. |
| 2005/0137963 A1 | 6/2005 | Ricketts et al. |
| 2005/0144067 A1 | 6/2005 | Farahat et al. |
| 2005/0154617 A1 | 7/2005 | Ruggieri et al. |
| 2005/0154664 A1 | 7/2005 | Guy et al. |
| 2005/0154769 A1 | 7/2005 | Eckart et al. |
| 2005/0159996 A1 | 7/2005 | Lazaraus et al. |
| 2005/0203768 A1 | 9/2005 | Florance |
| 2005/0267840 A1 | 12/2005 | Holm-Blagg et al. |
| 2005/0273431 A1 | 12/2005 | Abel et al. |
| 2005/0273442 A1 | 12/2005 | Bennett et al. |
| 2005/0278246 A1 | 12/2005 | Friedman et al. |
| 2005/0278542 A1 | 12/2005 | Pierson et al. |
| 2005/0279824 A1 | 12/2005 | Anderson et al. |
| 2006/0014129 A1 | 1/2006 | Coleman et al. |
| 2006/0031158 A1 | 2/2006 | Orman |
| 2006/0041464 A1 | 2/2006 | Powers et al. |
| 2006/0059073 A1 | 3/2006 | Walzak |
| 2006/0080230 A1 | 4/2006 | Freiberg |
| 2006/0080251 A1 | 4/2006 | Fried et al. |
| 2006/0080263 A1 | 4/2006 | Willis et al. |
| 2006/0095363 A1 | 5/2006 | May |
| 2006/0100954 A1 | 5/2006 | Schoen |
| 2006/0101508 A1 | 5/2006 | Taylor |
| 2006/0123461 A1 | 6/2006 | Lunt et al. |
| 2006/0129428 A1 | 6/2006 | Wennberg |
| 2006/0131390 A1 | 6/2006 | Kim |
| 2006/0149674 A1 | 7/2006 | Cook et al. |
| 2006/0155639 A1 | 7/2006 | Lynch et al. |
| 2006/0163347 A1 | 7/2006 | Foss et al. |
| 2006/0173772 A1 | 8/2006 | Hayes et al. |
| 2006/0173792 A1 | 8/2006 | Glass |
| 2006/0178971 A1 | 8/2006 | Owen et al. |
| 2006/0178983 A1 | 8/2006 | Nice et al. |
| 2006/0184410 A1 | 8/2006 | Ramamurthy et al. |
| 2006/0195351 A1 | 8/2006 | Bayburtian |
| 2006/0195391 A1 | 8/2006 | Stanelle |
| 2006/0200396 A1 | 9/2006 | Satterfield et al. |
| 2006/0204051 A1 | 9/2006 | Holland, IV |
| 2006/0212386 A1 | 9/2006 | Willey et al. |
| 2006/0229799 A1 | 10/2006 | Nimmo et al. |
| 2006/0229943 A1 | 10/2006 | Mathias et al. |
| 2006/0229996 A1 | 10/2006 | Keithley et al. |
| 2006/0233332 A1 | 10/2006 | Toms |
| 2006/0239512 A1 | 10/2006 | Petrillo |
| 2006/0241923 A1 | 10/2006 | Xu et al. |
| 2006/0242039 A1 | 10/2006 | Haggerty et al. |
| 2006/0248106 A1 | 11/2006 | Milne et al. |
| 2006/0259364 A1 | 11/2006 | Strock et al. |
| 2006/0265323 A1 | 11/2006 | Winter et al. |
| 2006/0267999 A1 | 11/2006 | Cash et al. |
| 2006/0271457 A1 | 11/2006 | Romain et al. |
| 2006/0271633 A1 | 11/2006 | Adler |
| 2006/0287764 A1 | 12/2006 | Kraft |
| 2006/0287766 A1 | 12/2006 | Kraft |
| 2006/0287767 A1 | 12/2006 | Kraft |
| 2006/0288090 A1 | 12/2006 | Kraft |
| 2006/0294199 A1 | 12/2006 | Bertholf |
| 2007/0016500 A1 | 1/2007 | Chatterji et al. |
| 2007/0016501 A1 | 1/2007 | Chatterji et al. |
| 2007/0016518 A1 | 1/2007 | Atkinson et al. |
| 2007/0016522 A1 | 1/2007 | Wang |
| 2007/0038483 A1 | 2/2007 | Wood |
| 2007/0038568 A1 | 2/2007 | Greene et al. |

(56) References Cited

U.S. PATENT DOCUMENTS

| | | |
|---|---|---|
| 2007/0067206 A1 | 3/2007 | Haggerty et al. |
| 2007/0067297 A1 | 3/2007 | Kublickis |
| 2007/0072190 A1 | 3/2007 | Aggarwal |
| 2007/0078741 A1 | 4/2007 | Haggerty et al. |
| 2007/0078908 A1 | 4/2007 | Rohatgi et al. |
| 2007/0083463 A1 | 4/2007 | Kraft |
| 2007/0093234 A1 | 4/2007 | Willis et al. |
| 2007/0100719 A1 | 5/2007 | Chwast et al. |
| 2007/0106582 A1 | 5/2007 | Baker et al. |
| 2007/0112668 A1 | 5/2007 | Celano et al. |
| 2007/0156718 A1 | 7/2007 | Hossfeld et al. |
| 2007/0168267 A1 | 7/2007 | Zimmerman et al. |
| 2007/0177768 A1 | 8/2007 | Tsantes et al. |
| 2007/0179798 A1 | 8/2007 | Inbarajan |
| 2007/0192248 A1 | 8/2007 | West |
| 2007/0205266 A1 | 9/2007 | Carr et al. |
| 2007/0208640 A1 | 9/2007 | Banasiak et al. |
| 2007/0214000 A1 | 9/2007 | Shahrabi et al. |
| 2007/0214076 A1 | 9/2007 | Robida et al. |
| 2007/0226093 A1 | 9/2007 | Chan et al. |
| 2007/0226114 A1 | 9/2007 | Haggerty et al. |
| 2007/0233591 A1 | 10/2007 | Newton |
| 2007/0244732 A1 | 10/2007 | Chatterji et al. |
| 2007/0260539 A1 | 11/2007 | Delinsky |
| 2007/0266439 A1 | 11/2007 | Kraft |
| 2007/0282736 A1 | 12/2007 | Conlin et al. |
| 2007/0288338 A1 | 12/2007 | Hoadley |
| 2007/0288490 A1 | 12/2007 | Longshaw |
| 2007/0299770 A1 | 12/2007 | Delinsky |
| 2007/0299771 A1 | 12/2007 | Brody |
| 2008/0010203 A1 | 1/2008 | Grant |
| 2008/0015954 A1 | 1/2008 | Huber et al. |
| 2008/0027841 A1 | 1/2008 | Eder |
| 2008/0027859 A1 | 1/2008 | Nathans et al. |
| 2008/0052224 A1 | 2/2008 | Parker |
| 2008/0059317 A1 | 3/2008 | Chandran et al. |
| 2008/0059364 A1 | 3/2008 | Tidwell et al. |
| 2008/0065530 A1 | 3/2008 | Talbert et al. |
| 2008/0103799 A1* | 5/2008 | Domenikos ........ G06Q 30/0185 705/318 |
| 2008/0109740 A1 | 5/2008 | Prinsen et al. |
| 2008/0133322 A1 | 6/2008 | Kalia et al. |
| 2008/0140507 A1 | 6/2008 | Hamlisch et al. |
| 2008/0154766 A1 | 6/2008 | Lewis et al. |
| 2008/0162383 A1 | 7/2008 | Kraft |
| 2008/0172324 A1 | 7/2008 | Johnson |
| 2008/0177655 A1 | 7/2008 | Zalik |
| 2008/0195548 A1 | 8/2008 | Chu et al. |
| 2008/0201257 A1 | 8/2008 | Lewis et al. |
| 2008/0205774 A1 | 8/2008 | Brinker et al. |
| 2008/0222015 A1 | 9/2008 | Megdal et al. |
| 2008/0222027 A1 | 9/2008 | Megdal et al. |
| 2008/0222706 A1 | 9/2008 | Renaud et al. |
| 2008/0270209 A1 | 10/2008 | Mauseth et al. |
| 2008/0270294 A1 | 10/2008 | Lent et al. |
| 2008/0270295 A1 | 10/2008 | Lent et al. |
| 2008/0294540 A1 | 11/2008 | Celka et al. |
| 2008/0294996 A1 | 11/2008 | Hunt et al. |
| 2008/0312969 A1 | 12/2008 | Raines et al. |
| 2009/0007231 A1 | 1/2009 | Kaiser et al. |
| 2009/0012889 A1 | 1/2009 | Finch |
| 2009/0018996 A1 | 1/2009 | Hunt et al. |
| 2009/0044279 A1 | 2/2009 | Crawford et al. |
| 2009/0055322 A1 | 2/2009 | Bykov et al. |
| 2009/0063330 A1 | 3/2009 | Cerise et al. |
| 2009/0089190 A1 | 4/2009 | Girulat |
| 2009/0099960 A1 | 4/2009 | Robida et al. |
| 2009/0106846 A1 | 4/2009 | Dupray et al. |
| 2009/0119199 A1 | 5/2009 | Salahi |
| 2009/0119299 A1 | 5/2009 | Rhodes |
| 2009/0125439 A1 | 5/2009 | Zarikian et al. |
| 2009/0126013 A1* | 5/2009 | Atwood ................ G06Q 40/02 707/999.107 |
| 2009/0132347 A1 | 5/2009 | Anderson et al. |
| 2009/0144160 A1 | 6/2009 | Haggerty et al. |
| 2009/0144185 A1 | 6/2009 | Haggerty et al. |
| 2009/0158030 A1 | 6/2009 | Rasti |
| 2009/0171723 A1 | 7/2009 | Jenkins |
| 2009/0210886 A1 | 8/2009 | Bhojwani et al. |
| 2009/0222308 A1 | 9/2009 | Zoldi et al. |
| 2009/0222375 A1 | 9/2009 | Choudhuri et al. |
| 2009/0222377 A1 | 9/2009 | Choudhuri et al. |
| 2009/0222379 A1 | 9/2009 | Choudhuri et al. |
| 2009/0240624 A1 | 9/2009 | James et al. |
| 2009/0271248 A1 | 10/2009 | Sherman et al. |
| 2009/0289110 A1 | 11/2009 | Regen et al. |
| 2009/0299911 A1 | 12/2009 | Abrahams et al. |
| 2009/0327120 A1 | 12/2009 | Eze et al. |
| 2010/0009320 A1 | 1/2010 | Wilkelis |
| 2010/0010935 A1 | 1/2010 | Shelton |
| 2010/0023434 A1 | 1/2010 | Bond |
| 2010/0082476 A1 | 4/2010 | Bowman |
| 2010/0114744 A1 | 5/2010 | Gonen |
| 2010/0122316 A1 | 5/2010 | Lyon |
| 2010/0145836 A1 | 6/2010 | Baker et al. |
| 2010/0145840 A1 | 6/2010 | Kasower |
| 2010/0174638 A1 | 7/2010 | Debie et al. |
| 2010/0223168 A1 | 9/2010 | Haggerty et al. |
| 2010/0223211 A1 | 9/2010 | Johnson et al. |
| 2010/0228658 A1 | 9/2010 | Ketelsen et al. |
| 2010/0250411 A1 | 9/2010 | Ogrodski |
| 2010/0253686 A1 | 10/2010 | Alsbury et al. |
| 2010/0257102 A1 | 10/2010 | Perlman |
| 2010/0268660 A1 | 10/2010 | Ekdahl |
| 2010/0299251 A1 | 11/2010 | Thomas |
| 2010/0299252 A1 | 11/2010 | Thomas |
| 2010/0299260 A1 | 11/2010 | Thomas |
| 2010/0324986 A1 | 12/2010 | Thomas |
| 2010/0325036 A1 | 12/2010 | Thomas |
| 2011/0004514 A1 | 1/2011 | Thomas |
| 2011/0004546 A1 | 1/2011 | Thomas |
| 2011/0029427 A1 | 2/2011 | Haggerty et al. |
| 2011/0060654 A1 | 3/2011 | Elliott et al. |
| 2011/0060673 A1 | 3/2011 | Delinsky et al. |
| 2011/0078073 A1 | 3/2011 | Annappindi et al. |
| 2011/0112950 A1 | 5/2011 | Haggerty et al. |
| 2011/0125632 A1 | 5/2011 | Neel |
| 2011/0137924 A1 | 6/2011 | Hunt et al. |
| 2011/0166988 A1 | 7/2011 | Coulter |
| 2011/0173116 A1 | 7/2011 | Yan et al. |
| 2011/0178841 A1 | 7/2011 | Rane et al. |
| 2011/0178899 A1 | 7/2011 | Huszar |
| 2011/0282779 A1 | 11/2011 | Megdal et al. |
| 2011/0295733 A1 | 12/2011 | Megdal et al. |
| 2012/0005070 A1 | 1/2012 | McFall et al. |
| 2012/0054090 A1 | 3/2012 | Haggerty et al. |
| 2012/0066106 A1 | 3/2012 | Papadimitriou |
| 2012/0101938 A1 | 4/2012 | Kasower |
| 2012/0101939 A1 | 4/2012 | Kasower |
| 2012/0116951 A1 | 5/2012 | Chung et al. |
| 2012/0123931 A1 | 5/2012 | Megdal et al. |
| 2012/0136774 A1 | 5/2012 | Imrey et al. |
| 2012/0191596 A1 | 7/2012 | Kremen et al. |
| 2012/0246048 A1 | 9/2012 | Cohen et al. |
| 2012/0246092 A1 | 9/2012 | Stibel et al. |
| 2012/0246093 A1 | 9/2012 | Stibel et al. |
| 2012/0253852 A1 | 10/2012 | Pourfallah et al. |
| 2012/0254018 A1 | 10/2012 | Davies et al. |
| 2012/0265661 A1 | 10/2012 | Megdal et al. |
| 2012/0271660 A1 | 10/2012 | Harris et al. |
| 2012/0278767 A1 | 11/2012 | Stibel et al. |
| 2012/0324388 A1 | 12/2012 | Rao et al. |
| 2012/0330689 A1 | 12/2012 | McLaughlin et al. |
| 2013/0006825 A1 | 1/2013 | Robida et al. |
| 2013/0007891 A1 | 1/2013 | Mogaki |
| 2013/0018795 A1 | 1/2013 | Kolhatkar et al. |
| 2013/0031105 A1 | 1/2013 | Stibel et al. |
| 2013/0103571 A1 | 4/2013 | Chung et al. |
| 2013/0110565 A1 | 5/2013 | Means et al. |
| 2013/0117087 A1 | 5/2013 | Coppinger |
| 2013/0173451 A1 | 7/2013 | Kornegay et al. |
| 2013/0173481 A1 | 7/2013 | Hirtenstein et al. |
| 2013/0191261 A1 | 7/2013 | Chandler et al. |
| 2013/0205135 A1 | 8/2013 | Lutz |

(56) References Cited

U.S. PATENT DOCUMENTS

| | | |
|---|---|---|
| 2013/0317954 A1 | 11/2013 | Psota et al. |
| 2013/0332338 A1 | 12/2013 | Yan et al. |
| 2013/0332341 A1 | 12/2013 | Papadimitriou |
| 2013/0339249 A1 | 12/2013 | Weller et al. |
| 2014/0012734 A1 | 1/2014 | Megdal et al. |
| 2014/0019333 A1 | 1/2014 | Morris et al. |
| 2014/0032300 A1 | 1/2014 | Zhang et al. |
| 2014/0032723 A1 | 1/2014 | Nema |
| 2014/0061302 A1 | 3/2014 | Hammad |
| 2014/0081835 A1 | 3/2014 | Choudhuri et al. |
| 2014/0110477 A1 | 4/2014 | Hammad |
| 2014/0156501 A1 | 6/2014 | Howe |
| 2014/0258089 A1 | 9/2014 | Pearson et al. |
| 2014/0279329 A1 | 9/2014 | Dancel |
| 2014/0279382 A1 | 9/2014 | Drakeley et al. |
| 2014/0372367 A1 | 12/2014 | McLean et al. |
| 2015/0026014 A1 | 1/2015 | Kasower |
| 2015/0073929 A1 | 3/2015 | Psota et al. |
| 2015/0112874 A1 | 4/2015 | Serio et al. |
| 2015/0161738 A1 | 6/2015 | Stempora |
| 2015/0186529 A1 | 7/2015 | Rope |
| 2015/0199757 A1 | 7/2015 | Lindholme et al. |
| 2015/0200948 A1 | 7/2015 | Cairns et al. |
| 2015/0228016 A1 | 8/2015 | Chandler |
| 2016/0125412 A1 | 5/2016 | Cannon |
| 2016/0224996 A1 | 8/2016 | Hunt et al. |
| 2017/0070500 A1 | 3/2017 | Hockey et al. |
| 2017/0161486 A1 | 6/2017 | Jeon et al. |
| 2017/0228820 A1 | 8/2017 | Rohn |
| 2017/0262758 A1 | 9/2017 | Boyapalle et al. |
| 2017/0323063 A1 | 11/2017 | Krause et al. |
| 2017/0323358 A1 | 11/2017 | Psota et al. |
| 2017/0352014 A1 | 12/2017 | Smith et al. |
| 2017/0359346 A1 | 12/2017 | Parab et al. |
| 2018/0040063 A1 | 2/2018 | Buechler et al. |
| 2018/0082371 A1 | 3/2018 | Chandler |
| 2018/0176267 A1 | 6/2018 | Malatesha et al. |
| 2018/0204279 A1 | 7/2018 | Painter et al. |
| 2018/0218069 A1 | 8/2018 | Rege et al. |
| 2018/0218448 A1 | 8/2018 | Thomas et al. |
| 2018/0285886 A1 | 10/2018 | Yan et al. |
| 2019/0019185 A1 | 1/2019 | Chitalia et al. |
| 2019/0034625 A1 | 1/2019 | Ford et al. |
| 2019/0066203 A1 | 2/2019 | Smith et al. |
| 2019/0102832 A1 | 4/2019 | Robida et al. |
| 2019/0156227 A1 | 5/2019 | Duke et al. |
| 2019/0188717 A1 | 6/2019 | Putnam et al. |
| 2019/0318122 A1 | 10/2019 | Hockey et al. |
| 2020/0034927 A1 | 1/2020 | Smith et al. |
| 2020/0074100 A1 | 3/2020 | Raneri et al. |
| 2020/0074541 A1 | 3/2020 | Finneran et al. |
| 2020/0074542 A1 | 3/2020 | Manna et al. |
| 2020/0076813 A1 | 3/2020 | Felice-Steele et al. |
| 2020/0106764 A1 | 4/2020 | Hockey et al. |
| 2020/0106765 A1 | 4/2020 | Hockey et al. |
| 2020/0137110 A1 | 4/2020 | Tyler et al. |
| 2020/0201878 A1 | 6/2020 | Putnam et al. |
| 2020/0202425 A1 | 6/2020 | Taylor-Shoff et al. |
| 2020/0211099 A1 | 7/2020 | Smith et al. |
| 2020/0213206 A1 | 7/2020 | Bracken et al. |
| 2020/0233850 A1 | 7/2020 | Girulat, Jr. |
| 2020/0327610 A1 | 10/2020 | Rohn et al. |
| 2020/0349639 A1 | 11/2020 | Mousseau |
| 2020/0372506 A1 | 11/2020 | Billman et al. |
| 2020/0389461 A1 | 12/2020 | Felice-Steele et al. |
| 2021/0152567 A1 | 5/2021 | Huston, III et al. |
| 2022/0051315 A1 | 2/2022 | Robida et al. |
| 2022/0217146 A1 | 7/2022 | Felice-Steele et al. |
| 2022/0335032 A1 | 10/2022 | Girulat, Jr. |
| 2023/0007007 A1 | 1/2023 | Manna |

FOREIGN PATENT DOCUMENTS

| | | |
|---|---|---|
| EP | 0 350 907 | 1/1990 |
| EP | 0 468 440 | 1/1992 |
| EP | 0 554 083 | 8/1993 |
| EP | 0 566 736 | 8/1993 |
| EP | 0 869 652 | 10/1998 |
| EP | 0 913 789 | 5/1999 |
| EP | 0 919 942 | 6/1999 |
| EP | 1 028 401 | 8/2000 |
| EP | 1 550 960 | 7/2005 |
| GB | 2 384 087 | 7/2003 |
| GB | 2 392 748 | 3/2004 |
| JP | 2001-282957 | 10/2001 |
| JP | 2002-163449 | 6/2002 |
| JP | 2003-016261 | 1/2003 |
| JP | 2003-316950 | 11/2003 |
| KR | 10-0638324 | 10/2006 |
| MX | 2007-015510 | 4/2008 |
| TW | I256569 | 6/2006 |
| WO | WO 94/006103 | 3/1994 |
| WO | WO 97/022073 | 6/1997 |
| WO | WO 99/046710 | 9/1999 |
| WO | WO 00/011574 | 3/2000 |
| WO | WO 00/052616 | 9/2000 |
| WO | WO 00/055789 | 9/2000 |
| WO | WO 00/055790 | 9/2000 |
| WO | WO 01/011522 | 2/2001 |
| WO | WO 01/016896 | 3/2001 |
| WO | WO 01/039090 | 5/2001 |
| WO | WO 01/039589 | 6/2001 |
| WO | WO 01/041083 | 6/2001 |
| WO | WO 01/045012 | 6/2001 |
| WO | WO 01/057720 | 8/2001 |
| WO | WO 01/080053 | 10/2001 |
| WO | WO 01/084281 | 11/2001 |
| WO | WO 02/027610 | 4/2002 |
| WO | WO 03/071388 | 8/2003 |
| WO | WO 2004/046882 | 6/2004 |
| WO | WO 2004/114160 | 12/2004 |
| WO | WO 2005/022348 | 3/2005 |
| WO | WO 2005/029369 | 3/2005 |
| WO | WO 2005/107405 | 11/2005 |
| WO | WO 2005/124619 | 12/2005 |
| WO | WO 2006/099492 | 9/2006 |
| WO | WO 2006/135451 | 12/2006 |
| WO | WO 2007/004158 | 1/2007 |
| WO | WO 2007/106393 | 9/2007 |
| WO | WO 2007/106786 | 9/2007 |
| WO | WO 2007/106787 | 9/2007 |
| WO | WO 2008/022289 | 2/2008 |
| WO | WO 2009/061342 | 5/2009 |
| WO | WO 2009/064840 | 5/2009 |
| WO | WO 2009/099448 | 8/2009 |
| WO | WO 2010/129257 | 11/2010 |
| WO | WO 2016/070096 | 5/2016 |
| WO | WO 2018/144612 | 8/2018 |
| WO | WO 2019/103979 | 5/2019 |
| WO | WO 2020/051154 | 3/2020 |
| WO | WO 2020/132026 | 6/2020 |

OTHER PUBLICATIONS

U.S. Appl. No. 16/037,221, U.S. Pat. No. 10,937,090, Report Existence Monitoring, filed Jul. 17, 2018.
U.S. Appl. No. 12/705,489, filed Feb. 12, 2010, Bargoli et al.
U.S. Appl. No. 12/705,511, filed Feb. 12, 2010, Bargoli et al.
Abrahams, Steven W., "The New View in Mortgage Prepayments: Insight from Analysis at the Loan-By-Loan Level," The Journal of Fixed Income, Jun. 1997, vol. 7, No. 1, pp. 8-21.
Apte, et al., "A Probabilistic Estimation Framework for Predictive Modeling Analytics," IBM Systems Journal, 2002, vol. 41, No. 3, pp. 438-448.
AISG's National Underwriting Database, A-PLUS, is Now the Largest in the Industry, Business Wire, Aug. 7, 1997.
Announcing TrueProfiler, http://web.archive.org/web/20021201123646/http://www.truecredit.com/index.asp, dated Dec. 1, 2002, 2 pages.
"AT&T Expected to Turn Up Heat in Card Wars", American Banker, May 27, 1993, vol. 158, No. 101, pp. 3.
Avery et al., "Consumer Credit Scoring: Do Situational Circumstances Matter?", Journal of Banking & Finance, vol. 28, 2004, pp. 835-856.

(56) References Cited

OTHER PUBLICATIONS

Awoonor-Williams, Princess Josephine, Ph.D. "Gender and Credit: An Analysis of Women's Experience in the Credit Market", ProQuest Dissertations and Theses, May 2004, pp. 148.
"Balance Transfers Offer Opportunities", Risk Credit Risk Management Report, Jan. 29, 1996, vol. 6, No. 2, pp. 2.
Bancroft, John, "Tools Help Managers with Risk Management," Real Estate Finance Today, May 26, 1997, pp. 11-12.
"Bank of America Direct Web-Based Network Adds Core Functionality to Meet Day-To-Day Treasury Needs", Business Wire, Oct. 25, 1999. pp. 2.
Barone, Robert P., "The Integrated Approach to Branch Service Delivery," American Banker, Aug. 6, 1991, http://www.highbeam.com/doc/1G1-11128400.html.
Bilotta, Caryn, "Understanding Credit Scores," Pittsburgh Post—Gazette, May 9, 2010.
Brown et al., "ALCOD IDSS: Assisting the Australian Stock Market Surveillance Team's Review Process," Applied Artificial Intelligence Journal, Dec. 1, 1996, pp. 625-641.
Cantor, R. and Packer, F., "The Credit Rating Industry," FRBNY Quarterly Review, Summer-Fall, 1994, pp. 1-24.
"Chase Gets Positive," Bank Technology News, May 6, 2000, vol. 14, No. 5, p. 33.
Chatterjee et al., "Expenditure Patterns and Aggregate Consumer Behavior, Some Experiments with Australian and New Zealand Data", The Economic Record, vol. 70, No. 210, Sep. 1994, pp. 278-291.
Chores & Allowances, "Do Kids Have Credit Reports?" Oct. 15, 2007, http://choresandallowances.blogspot.com/2007/10/do-kids-have-credit-reports.html, pp. 5.
CISCO: What-If Simulator, http://www.ciscocredit.com/whatifsim.html printed Oct. 12, 2012 in 2 pages.
CISCO: Your Mortgage Credit Reporting Specialists, http://www.ciscocredit.com/cc_Services.html printed Oct. 12, 2012 in 4 pages.
"Cole Taylor Bank Chooses Integrated E-Banking/E-Payments/Reconciliation Solution From Fundtech", Business Wire, Oct. 21, 1999, pp. 2.
"Consumer Reports Finds American-Made Vehicles Close Reliability Gap with European-Made Vehicle—As Japanese Continue to Set New Benchmarks for the Industry", Consumer Reports: Consumers Union, Yonkers, NY, Apr. 2003, pp. 2.
CreditAnalyst, Digital Matrix Systems, as printed out Mar. 4, 2008, pp. 2.
CreditToolkit, Digital Matrix Systems, as printed out Mar. 4, 2008, pp. 2.
CreditXpert, http://www.creditxpert.com/Products/individuals.asp printed Oct. 12, 2012 in 1 page.
"Credit Information Bureaus and 'CIBIL'", http://www.icicibank.com/cibil.html printed Aug. 22, 2012 in 3 pages.
CreditKarma: How Credit Karma Works, http://www.creditkarma.com/help/howitworks printed Oct. 12, 2012 in 2 pages.
Credit Source Online: The Secrets of Raising Your Credit Score, http://www.creditsourceonline.com/secrets-of-raising-your-credit-score.html printed Oct. 12, 2012 in 4 pages.
ComScore Networks Launches Business Unit to Help Credit Card Marketers Master Online and Multi-Channel Strategies—Solutions Provide Unprecedented Insight Into Customer Acquisition and Usage Opportunities, Reston, VA, Oct. 11, 2001, 2 pages.
Cowie, Norman, "Warning Bells & 'The Bust-Out'", Business Credit, Jul. 1, 2000, pp. 5.
Credit Card Management, "Neural Nets Shoot for Jackpot," Dec. 1995, pp. 1-6.
Credit Risk Management Report, Potomac, Mar. 9, 1998, vol. 8, No. 4.
CreditXpert Inc., CreditXpert 3-Bureau Comparison™, 2002, pp. 5, as archived Jun. 8, 2003 from http://web.archive.org/web/20030608171018/http://creditxpert.com/CreditXpert%203-Bureau%20Comparison(TM)%20sample.pdf.
CreditXpert Inc., CreditXpert Credit Score & Analysis™, Jan. 11, 2000, pp. 6, http://web.archive.org/web/20030611070058/http://www.creditxpert.com/CreditXpert%20Score%20&%20Analysis%20and%20Credit%20Wizard%20sample.pdf.
CreditXpert Inc., CreditXpert Essentials™, Advisor View-Experian on Jul. 7, 2003, http://www.creditxpert.com/cx_ess_app.pdf.
CreditXpert Inc., CreditXpert Essentials™, Advisor View-TransUnion on Oct. 10, 1999, pp. 6, http://web.archive.org/web/20041211052543/http://creditxpert.com/cx_ess_app.pdf.
CreditXpert Inc., CreditXpert Essentials™, Applicant View-TransUnion on Oct. 10, 1999, pp. 6, http://www.creditxpert.com/cx_ess_app.pdf.
CreditXpert Inc., CreditXpert What-If Simulator™, 2002, pp. 8, as archived Jun. 30, 2003 from http://web.archive.org/web/20030630132914/http://creditxpert.com/CreditXpert%20What-If%20Simulator(TM)%20sample.pdf.
Dash, Julekha, "Java on the Street," Software Magazine, Oct. 1, 1997, vol. 17, No. 11, p. 2.
Dataman Group, "Summarized Credit Statistics," Aug. 22, 2001, http://web.archive.org/web/20010822113446/http://www.datamangroup.com/summarized_credit.asp.
David, Alexander, "Controlling Information Premia by Repackaging Asset-Backed Securities," The Journal of Risk and Insurance, Dec. 1997, 26 pages.
Davis, Lisa, "Safety in Numbers," Business North Carolina, Sep. 1, 1995, vol. 15, No. 9, p. 24.
"Debt Settlement: Watch Video on how to Pay Your Debt Faster", http://www.debtconsolidationcare.com/debt-settlement.html printed Jan. 9, 2013 in 6 pages.
Demby, Elayne, "Special Report: Letting Consumers Know the Score—and More", Collections and Credit Risk, New York, Feb. 2003, vol. 8, Issue 2, p. 53, pp. 3.
Department of Real Estate, http://web.archive.org/web/20040619190012/http://www.dre.ca.gov/pubs_sub.htm, Jun. 19, 2004, in 5 pages.
Department of Real Estate, "Reference Book," http://web.archive.org/web/20041011063158/http://www.dre.ca.gov/pdf_docs/ref17.pdf, Jun. 18, 2004, Chapter 17, pp. 311-382.
Dillon et al., "Good Science", Marketing Research: A Magazine of Management & Applications TM, Winter 1997, vol. 9, No. 4; pp. 11.
Downing, Jr.; Richard, "Changes to the Credit Reporting Act," Mortgage Banking, Apr. 1, 1998, vol. 58, No. 7, pp. 82-85.
Ecredable: Discover your AMP Credit Rating™, http://www.ecredable.com/how-it-works/amp-credit-rating printed Oct. 12, 2012 in 2 pages.
EFunds Corporation, "Data & Decisioning: Debit Report" printed Apr. 1, 2007, http://www.efunds.com/web/industry-solutions/financial-services/frm-debit-report/htm in 1 page.
EFunds Introduces QualiFileSM, Deluxe Corporation, eFunds Press Release and Product Launch, Sep. 23, 1999, Milwaukee, WI.
Equifax: Consumer Bureau, http://www.equifax.co.in/financial-services/consumer_bureau/en_in#RiskScore printed Oct. 12, 2012 in 3 pages.
ETTORRE, "Paul Kahn on Exceptional Marketing," Management Review, vol. 83, No. 11, Nov. 1994, pp. 48-51.
"Equifax and FICO Serve Consumers", Mortgage Servicing News, Mar. 2001, vol. 5, No. 3, p. 19.
Experian, http://www.experian.com/ printed Oct. 12, 2012 in 1 page.
Experian Announces PLUS Score; Experian Press Release dated Oct. 16, 2003; Experian Global Press Office.
"Experian Launches Portfolio Monitor—Owner NoticesSM", News Release, Feb. 2003, Costa Mesa, CA.
Experian-Scorex Announces New Credit Simulation Tool, PR Newswire, Costa Mesa, CA, Jun. 13, 2005.
Experian, Custom Strategist and Qualifile from Funds, Jun. 2000, in 2 pages.
Experian Information Solutions, Inc., Credit Trends: Access Credit Trending Information Instantly, http://kewaneecreditbureau.com/Credit.Trends.pdf, Aug. 2000, pp. 4.
Fair Isaac Announces Integrated, End-to-End Collection and Recovery Solution, Business Wire, New York, Sep. 2, 2004, p. 1.
Fair Isaac Corporation, myFICO: Calculators: Credit Assessment, as printed Jun. 8, 2005 in 2 pages, http://www.myfico.com/CreditEducation/Calculators/CreditAssessment.aspx.

(56) References Cited

OTHER PUBLICATIONS

Fair Isaac Corporation, myFICO: Help: FICO Score Simulator, as printed Jun. 8, 2005 in 2 pages, http://www.myfico.com/Help/Simulator.aspx?fire=5.
Fair Isaac Corporation, myFICO: Products: Suze Orman's FICO Kit Platinum, as printed Jun. 8, 2005 in 4 pages, http://www.myfico.com/Products/FICOKit/Description.aspx.
Fair Isaac Corporation, myFICO: Products: Suze Orman's FICO® Kit Platinum: FICO Score Check, as printed Jun. 7, 2005 in 1 page, http://www.myfico.com/Products/FICOKit/Sample03.html.
Fair Isaac Corporation, myFICO: Products: Suze Orman's FICO®. Kit Platinum: Look for Errors, as printed Jun. 7, 2005 in 3 pages http://www.myfico.com/Products/FICOKit/Sample02.html.
Fair Isaac Corporation, myFICO: Products:Suze Orman's FICO® Kit Platinum: Your FICO Score, as printed Jun. 7, 2005 in 1 page, http://www.mvfico.com/Products/FICOKit/Sample01.html.
Fair Isaac Corporation, myFICO: Sample: FICO Score Simulator, as printed Jun. 8, 2005 in 5 pages, http://www.rnyfico.com/Content/Samples/Sample_ScoreSimulator.asp.
Fair Isaac Corporation, myFICO: Sample: FICO Score Simulator: Max Out All Your Credit Cards, as printed Jun. 8, 2005 in 2 pages, http://www.myfico.com/Content/Samples/Sample_ScoreSimulator-Results.asp? Simulation=4&ReportID=1&productID=&Execute.x=105&Execute.y=23.
Fair Isaac Corporation, myFICO: Sample: FICO Score Simulator: Miss Payments on All Accounts With a Payment Due, as printed Jun. 8, 2005 in 2 pages, http://www.myfico.com/Content/Samples/Sample_ScoreSimulatorResults.asp?miss_payment=radiobutton&Simulation=2&ReportID=1&ProductID=&Execute.x81&Execute.y=28>.
Fair Isaac Corporation, myFICO: Sample: FICO Score Simulator: Pay Down Delinquent Balances First, as printed Jun. 8, 2005 in 2 pages, http://www.myfico.com/Content/Samples/Sample_ScoreSimulatorResults.asp?textfieldCC=750&Simulation=7&ReportID=1&ProductID=&PayDelinquent.x=78&PayDelinquent.y=30.
Fair Isaac Corporation, myFICO: Sample: FICO Score Simulator: Pay Down the Balances on All Your Credit Cards, as printed Jun. 8, 2005 in 2 pages, http://www.myfico.com/Content/Samples/Sample_ScoreSimulatorResults.asp?textfieldCC1=750&SelectMonths=1&PayOption=radiobutton&textfieldCC=750&Simulation=3&ReportID=1&ProductID=&Execute.x=57&Execute.y=22.
Fair Isaac Corporation, myFICO: Sample: FICO Score Simulator: Pay Your Bills on Time, as printed Jun. 8, 2005 in 2 pages, http://www.myfico.com/Content/Samples/Sample_ScoreSimulator-Results.asp?select1=1&Simulation=1&ReportID=1&ProductID=&PayBillsOnTime.x=93&PayBillsOnTime.y=23.
Fair Isaac Corporation, myFICO: Sample: FICO Score Simulator: Seek New Credit, as printed Jun. 8, 2005 in 2 pages, http://www.myfico.com/Content/Samples/Sample_ScoreSimulatorResults.asp?new_credit=radiobutton&textfield5A=3000&tectfield5B=&textfield5C=&Simulation=5&ReportID=1&ProductID=&NewCredit.x=62&NewCredit.y=20.
Fair Isaac Corporation, myFICO: Sample: FICO Score Simulator: Suggested Best Action, as printed Jun. 8, 2005 in 2 pages, http://www.myfico.com/Content/Samples/Sample_ScoreSimulatorResults.asp?Simulation=111&ReportID=1&ProductID=&TopAction.x=66&TopAction.y=16.
Fair Isaac Corporation, myFICO: Sample: FICO Score Simulator: Transfer Credit Card Balances, as printed Jun. 8, 2005 in 2 pages, http://www.myfico.com/Content/Samples/Sample_ScoreSimulator-Results.asp?textfield222=5000&Simulation=6&ReportID=1&ProductID=&TransferBalance.x=86&TransferBalance.y=24.
"Fair Isaac Introduces Falcon One System to Combat Fraud at Every Customer Interaction", Business Wire, May 5, 2005, pp. 3.
"Fair Isaac Offers New Fraud Tool", National Mortgage News & Source Media, Inc., Jun. 13, 2005, pp. 2.
FamilySecure.com; "Identity Theft Protection for the Whole Family | FamilySecure.com" http://www.familysecure.com/, as retrieved on Nov. 5, 2009.
Fickenscher, Lisa, "Merchant American Express Seeks to Mine its Data on Cardholder Spending Patterns," American Banker, vol. 162, Issue 56, Mar. 24, 1997, pp. 1-2.
Financial Engines, http://corp.financialengines.com/ printed Oct. 12, 2012 in 1 page.
"FinExtra, Basepoint Analytics Introduces Predictive Technology for Mortgage Fraud", Oct. 5, 2005, pp. 3.
Fisher, Joseph, "Access to Fair Credit Reports: Current Practices and Proposed Legislation," American Business Law Journal, Fall 1981, vol. 19, No. 3, p. 319.
Forrest, David, "Achieving Perfect Credit—Lesson 3: Assessing Your Situation," https://web.archive.org/web/20140828173720/http://www.fool.com/seminars/ev/index.htm?sid=0029&lid=300, as archived Aug. 28, 2014, copyright 1995-2002, in 7 pages.
Frank, John, "Scoring Takes on a New Meaning," Credit Card Management, Sep. 1996, vol. 9, No. 6, pp. 155-159.
"Fraud Alert | Learn How". Fight Identity Theft. http://www.fightidentitytheft.com/flag.html, accessed on Nov. 5, 2009.
"FTC Testifies: Identity Theft on the Rise", FTC News Release, Mar. 7, 2000, pp. 3.
"Fund Manager," Portfolio Management Software website, indexed into Google on Jan. 7, 2005, Retrieved Oct. 24, 2014 http://www.fundmanagersoftware.com/, http://www.fundmanagersoftware.com/help/gph_tp_pieasset.html, http://www.fundmanagersoftware.com/demo2.html.
GAO-03-661, Best Practices: Improved Knowledge of DOD Service Contracts Could Reveal Significant Savings, GAO, Jun. 2003.
Gibbs, Adrienne; "Protecting Your Children from Identity Theft," Nov. 25, 2008, http://www.creditcards.com/credit-card-news/identity-ID-theft-and-kids-children-1282.php, pp. 4.
Gilje, Shelby, "Keeping Tabs on Businesses That Keep Tabs on Us", NewsRoom, The Seattle Times, Section: SCENE, Apr. 19, 1995, pp. 4.
Giudici, Paolo, "Bayesian Data Mining, with Application to Benchmarking and Credit Scoring," Applied Stochastic Models in Business and Industry, 2001, vol. 17, pp. 69-81.
Gopalan, R., "Panning for Sales-Force Gold", Intelligent Enterprise, Dec. 21, 1999, vol. 2, No. 18, pp. 39-43.
"Green Tree Investors May Go to Court," Mar. 4, 1998, http://web.archive.org/web/20001101080021/http://www.channel4000.com/news/stories/news-980304-120038.html.
"Groups Demand Government Action on Online Marketing to Children," American Marketplace, Apr. 4, 1996, vol. 17, No. 7, p. 53.
Gualtieri et al., "The Forrester Wave™: Big Data Streaming Analytics, Q1 2016", Forrester®, Mar. 30, 2016, pp. 14, https://www.sas.com/content/dam/SAS/en_us/doc/analystreport/forrester-big-data-streaming-analytics-108218.pdf.
Healy, Thomas J., "The New Science of Borrower Behavior," Mortgage Banking, vol. 58, No. 5, pp. 26-35, Feb. 1, 1998.
Hill, Kerry, "Identity Theft Your Social Security Number Provides Avenue for Thieves", NewsRoom, Wisconsin State Journal, Sep. 13, 1998, pp. 4.
ID Theft Assist, "Do You Know Where Your Child's Credit Is?", Nov. 26, 2007, http://www.idtheftassist.com/pages/story14, pp. 3.
IDEON, Credit-Card Registry that Bellyflopped this Year, Is Drawing some Bottom-Fishers, The Wall Street Journal, Aug. 21, 1995, pp. C2.
"Impac Funding Introduces Enhanced Website for Static Pool Tracking of MBS Transactions," Waltham, MA; Webpage printed out from http://www.lewtan.com/press/1208044_Impac-Lewtan.htm on Mar. 20, 2008.
"Industry News, New Technology Identifies Mortgage Fraud: Basepoint Analytics Launches FraudMark", Inman News, American Land Title Association, Oct. 5, 2005, pp. 1.
Instant Access to Credit Reports Now Available Online with DMS' CreditBrowser-based system also Simplifies Credit Decisioning and Offers a Central Point of Control, Business Wire, Dallas, May 23, 2000, p. 0264.
Internal Revenue Service Data Book 2000, Issued Aug. 2001, Revised May 2003.

(56) References Cited

OTHER PUBLICATIONS

Jacob et al., A Case Study of Checking Account Inquiries and Closures in Chicago, The Center for Financial Services Innovation, Nov. 2006.
Jones, Yvonne, "Consumers Understood the Basics but Could Benefit from Targeted Educational Efforts," GAO U.S. Government Accountability Office, Mar. 16, 2005, pp. 128, http://www.gao.gov/products/GAO-05-223.
"JPMorgan Worldwide Securities Services to Acquire Paloma's Middle and Back Office Operations," Webpage printed from http://www.jpmorgan.com on Apr. 1, 2009.
"Judging Credit: Consumers Need Better Finance Tools", News Journal, Daytona Beach, FL, Dec. 28, 2002.
Kulkosky, Edward, "Credit Scoring Appeal Transcends Underwriting," American Banker, vol. 161, No. 93, p. 8, May 15, 1996.
Kuykendall, Lavonne, "Divergent Paths in Early Pacts with Credit Bureaus", American Banker, May 30, 2002, vol. 167, No. 3, pp. 2.
Lan, Joe, "The Top Portfolio Management Software," http://www.aaii.com/computerizedinvesting/article/the-top-portfolio-management-software, Includes Discussion thread, Fourth Quarter 2011, pp. 17.
Langer et al., "Creditor List Screening Practices: Certain Implications Under the Fair Credit Reporting Act and the Equal Credit Opportunity Act," The Business Lawyer, May 1988, vol. 43, pp. 1123-1141.
Lee, W.A., "Experian Eyes Payments, Mulls Deals" American Banker: The Financial Services Daily, 2pgs., New York, NY, May 30, 2003.
Lee, W.A.; "Experian, on Deal Hunt, Nets Identity Theft Insurer", American Banker: The Financial Services Daily, Jun. 4, 2003, New York, NY, 1 page.
Lee, W.A.; "Fair Isaac Taps Institutions for Credit Score Distribution", American Banker: The Financial Services Daily, New York, NY, Apr. 9, 2002, vol. 167, Issue 67, 1 Page.
Lee, W.A., "Money, Quicken, and the Value of Alliances", American Banker: The Financial Services Daily, 2pgs., New York, NY, Jul. 28, 2003.
LendingTree.com, "Lender Ratings & Reviews," http://web.archive.org/web/20091015043716/http://www.lendingtree.com/lender-reviews/, Oct. 15, 2009, in 21 pages.
Letter to Donald A. Robert from Carolyn B. Maloney, dated Oct. 31, 2007, pp. 2.
Letter to Donald A. Robert from Senator Charles E. Schumer, dated Oct. 11, 2007, pp. 2.
Letter to Harry C. Gambill from Carolyn B. Maloney, dated Oct. 31, 2007, pp. 2.
Letter to Harry C. Gambill from Senator Charles E. Schumer, dated Oct. 11, 2007, pp. 2.
Letter to Richard F. Smith from Carolyn B. Maloney, dated Oct. 31, 2007, pp. 2.
Letter to Richard F. Smith from Senator Charles E. Schumer, dated Oct. 11, 2007, pp. 2.
LifeLock, "How LifeLock Works," http://www.lifelock.com/lifelock-for-people printed Mar. 14, 2008 in 1 page.
LifeLock, "Identity Theft F.A.Q." http://web.archive.org/web/20080215093614/http://www.identitytheftkiller.com/promo/faq.php, Feb. 15, 2008, pp. 8.
LifeLock, "LifeLock Launches First ID Theft Prevention Program for the Protection of Children," Press Release, Oct. 14, 2005, http://www.lifelock.com/about-us/press-room/2005-press-releases/lifelock-protection-for-children.
LifeLock; "How Can LifeLock Protect My Kids and Family?" http://www.lifelock.com/lifelock-for-people/how-we-do-it/how-can-lifelock-protect-my-kids-and-family printed Mar. 14, 2008 in 1 page.
LifeLock, "Personal Identity Theft Protection & Identity Theft Products," http://www.lifelock.com/lifelock-for-people, accessed Nov. 5, 2007.
LifeLock, Various Pages, www.lifelock.com/, Jan. 9, 2007, pp. 49.
Longo, Tracey, "Managing Money: Your Family Finances", Kiplinger's Personal Finance Magazine, Jun. 1, 1995, vol. 49, No. 6, pp. 4.
Lund, Graham, "Credit Bureau Data: Maximizing the Benefits," Credit Management, May 2004, ProQuest Central, pp. 44-45.
Menge, Falko, "Enterprise Service Bus", Free and Open Source Software Conference, 2007, pp. 6.
Merriam Webster's Collegiate Dictionary, 10th Edition, Jan. 1, 1993, p. 79.
Miller, Margaret, "Credit Reporting Systems Around the Globe: The State of the Art in Public and Private Credit Registries", Jun. 2000, pp. 32, http://siteresources.worldbank.org/INTRES/Resources/469232-1107449512766/Credit_Reporting_Systems_Around_The_Globe.pdf.
Montgomery County Housing Report, Residential Market Report, Jan. 2004 in 6 pages.
MyFico, http://www.myfico.com/products/ficoone/sample/sample_scoresimulator.aspx printed Oct. 12, 2012 in 3 pages.
National Alert Registry Launches RegisteredOffendersList.org to Provide Information on Registered Sex Offenders, May 16, 2005, pp. 2, http://www.prweb.com/printer/240437.htm accessed on Oct. 18, 2011.
National Alert Registry Offers Free Child Safety "Safe From Harm" DVD and Child Identification Kit, Oct. 24, 2006. pp. 2, http://www.prleap.com/pr/53170 accessed on Oct. 18, 2011.
National Alert Registry website titled, "Does a sexual offender live in your neighborhood", Oct. 22, 2006, pp. 2, http://web.archive.org/wb/20061022204835/http://www.nationallertregistry.com/ accessed on Oct. 13, 2011.
"New Privista Product Provides Early Warning System to Combat Identity Theft", PR Newswire, Oct. 24, 2000, PR Newswire Association, Inc., New York.
"NewsHound: NewsHound User Guide Internet E-Mail", of record as early as May 2, 1997, pp. 11.
"New for Investors: Asset Allocation, Seasoned Returns and More," Prosper, http://blog.prosper.com/2011/10/27/new-for-investors-asset-allocation-seasoned-returns-and-more/, Oct. 27, 2011, pp. 4.
"Normalize," http://www.merriam-webster.com/dictionary/normalize printed Jun. 14, 2010.
Novack, Janet, "The Coming Fight over FICO," Forbes, Dec. 18, 1995, vol. 156, No. 14, p. 96.
Occasional CF Newsletter; http://www.halhelms.com/index.cfm?fuseaction=newsletters.oct1999; Oct. 1999.
Office of Integrated Analysis and Forecasting, DOE/EIA-M065(2004), Model Documentation Report: Macroeconomic Activity Module (MAM) of the National Energy Modeling System, EIA, Washington DC, Feb. 2004.
Pagano, et al., "Information Sharing in Credit Markets," Dec. 1993, The Journal of Finance, vol. 48, No. 5, pp. 1693-1718.
Partnoy, Frank, Rethinking Regulation of Credit Rating Agencies: An Institutional Investor Perspective, Council of Institutional Investors, Apr. 2009, pp. 21.
Polatoglu et al., "Theory and Methodology, Probability Distributions of Cost, Revenue and Profit over a Warranty Cycle", European Journal of Operational Research, Jul. 1998, vol. 108, Issue 1, pp. 170-183.
Powerforms: Declarative Client-Side for Field Validation, ISSN 1386-145x, Dec. 2000.
"ProClarity and Microsoft to Host Free Seminar Series on Retail Analytics with Independent Analyst Firm-ProClarity to Share Best Forrester Analysts to Discuss Trends and the Future of the Retail"; Business Wire; pp. 2; Aug. 13, 2003.
"Qualifying for Debt Settlement", http://www.certifieddebt.com/debt/settlement-qualifications.shtml printed Jan. 9, 2013 in 2 pages.
Quantix Software, "Investment Account Manager," available at https://www.youtube.com/watch?v=1UwNTEER1Kk, as published Mar. 21, 2012.
Ratner, Juliana, "GMAC to Sell Risk-Management Advice; Target is 150 Biggest Home Loan Servicers," American Banker, vol. 161, No. 53, p. 16, Mar. 19, 1996.
"Recognition and use by Appraisers of Energy-Performance Benchmarking Tools for Commercial Buildings," prepared by the Institute for Market Transformation, NYSERDA, Feb. 2003, pp. 6.
"Resolve Debt for Less: With Help from Freedom Financial" http://www.debtsettlementusa.com/ printed Jan. 9, 2013 in 6 pages.

(56) References Cited

OTHER PUBLICATIONS

"RF/Spectrum to Offer Score," National Mortgage News, Special Report; Credit Reporting & Scaring, Jun. 9, 1997, p. 40.
Risk Monitors, "New GMAC Unit Focuses on Portfolio Risk," PR Newswire, Mar. 13, 1996, pp. 2. http://www.thefreelibrary.com/NEW+GMAC+UNIT+FOCUSES+ON+PORTFOLIO+RISK-a018092212.
Saunders, A., "Data Goldmine," Management Today, London: Mar. 1, 2004, 6 pages.
Schmidt, David, "Environmental Impact: The Changing Credit Reporting Landscape," Business Credit, Apr. 2003, vol. 105, No. 4, pp. 14 (electronic copy provided in 5 pages).
Screenshot for Investment Account Manager v.2.8.3, published at http://www.aaii.com/objects/get/1642.gif by at least Aug. 30, 2011 in 1 page.
Sealey, Geraldine, "Child ID Theft Can Go Unnoticed for Years", http://abcnews.go.com/US/story?id=90257, Sep. 12, 2003 in 9 pages.
"Settling Your Debts—Part 1 in Our Debt Settlement Series", http://www.creditinfocenter.com/debt/settle_debts.shtml printed Jan. 9, 2013 in 6 pages.
"Shareholders Sue Green Tree Financial," Dated Dec. 4, 1997, http://web.archive.org/web/20000419070107/http://www.wcco.com/news/stories/news-971204-092238.html.
Singletary, Michelle "Ratings for the Credit Raters", The Washington Post, The Color of Money column, Mar. 24, 2002 in 1 page.
Singletary, Michelle, "Score One for Open Credit Ratings", The Washington Post, Washington DC, Jun. 18, 2000, 3 pages.
Stanton, T.H., "Credit Scoring and Loan Scoring as Tools for Improved Management of Federal Credit Programs", Financier, Philadelphia, Summer 1999, vol. 6, 36 pages.
Steele, Georgia, "Fair, Isaac Seeks Mortgage Tech Opportunities," National Mortgage News, Special Report; B & C Lending, Mar. 23, 1998, p. 34.
Stein, Benchmarking Default Prediction Models: Pitfalls and Remedies in Model Validation, Moody's KMV, Revised Jun. 13, 2002, Technical Report #020305; New York.
Sullivan, Deidre, "Scoring Borrower Risk," Mortgage Banking, Nov. 1994, vol. 55, No. 2, pp. 94-98.
Sumner, Anthony, "Tackling the Issue of Bust-Out Fraud", Retail Banker International, Jul. 24, 2007, pp. 4.
Taylor, Marshall, "Loan-Level Pricing Draws Interest From Investors," Real Estate Finance Today, Jul. 7, 1997, vol. 14, No. 14. p. 10.
"The Best of the Best," Mortgage Technology, Nov. 1, 2003, vol. 10, No. 8, pp. 34-53.
TheMorningCall.Com, "Cheap Ways to Foil Identity Theft," www.mcall.com/business/columnists/all-karp.5920748jul01,0 . . . , published Jul. 1, 2007.
Todorova, Aleksandra, "Protecting Your Child's Identity", Smart Money, Published Aug. 2, 2007, pp. 1-5.
"TransUnion—Child Identity Theft Inquiry", TransUnion, http://www.transunion.com/corporate/personal/fraudIdentityTheft/fraudPrevention/childIDInquiry.page as printed Nov. 5, 2009 in 4 pages.
TransUnion: VantageScore®—Consistency in Credit Scoring, http://www.transunion.com/personal-credit/credit-reports/vantage-score.page printed Oct. 12, 2012 in 2 pages.
Trulia, "Trulia Estimates," http://www.trulia.com/trulia_estimates/, printed Feb. 18, 2014 in 2 pages.
Truston, "Checking if your Child is an ID Theft Victim can be Stressful,"as posted by Michelle Pastor on Jan. 22, 2007 at http://www.mytruston.com/blog/credit/checking_if_your_child_is_an_id_theft_vi.html.
Tuman, Diane, "What is a Zestimate?" Mar. 2013, pp. 5, http://www.zillow.com/wikipages/What-is-a-Zestimate/.
"Use of Alternative Data to Enhance Credit Reporting to Enable Access to Digital Financial Services by Individuals and SMEs Operating in the Informal Economy", Guidance Note, International Committee on Credit Reporting (ICCR), Jun. 28, 2018, pp. 35.

Vamosi, Robert, "How to Handle ID Fraud's Youngest Victims," Nov. 21, 2008, http://news.cnet.com/8301-10789_3-10105303-57.html.
Van Collie, Shimon, "The Road to Better Credit-Card Marketing,"Bank Technology News, Sep. 1995, pp. 4.
Verstraeten, Geert, Ph.D.; Issues in predictive modeling of individual customer behavior: Applications in targeted marketing and consumer credit scoring; Universiteit Gent (Belgium), Dec. 2005.
Wahl, Martin, "The Stampede to Subprime," Mortgage Banking, Oct. 1, 1997, vol. 58, No. 1, p. 26(7).
Watts, Craig, "Consumers Now Can Know What Loan Rate Offers to Expect Based on Their FICO Credit Score at MyFICO.com," San Rafael, CA, Mar. 6, 2002, pp. 2, http://www.myfico.com/PressRoom/PressReleases/2002_03_06.aspx.
Watts, Craig, "Fair, Isaac and Equifax Give Consumers New Score Power Tools Offering Greater Insights for Managing Their Credit Health," May 21, 2002, pp. 3, http://www.myfico.com/PressRoom/PressReleases/2002_05_21.aspx.
Webpage printed from http://www.magnum.net/pdfs/RapUpBrochure.pdf as printed Mar. 3, 2008.
"We Eliminate Bad Debt", as printed from http://www.webcreditbureau.com/start/, dated Aug. 22, 2012, 1 Page.
West, David, "Neural Network Credit Scoring Models", Computers & Operations Research, vol. 27, 2000, pp. 1131-1152.
Wood, Greg, "Top Streaming Technologies for Data Lakes and Real-Time Data", http://blog.zaloni.com/top-streaming-technologies-for-data-lakes-and-real-time-data, Sep. 20, 2016 in 3 pages.
Yang, et al., "An Analysis of the Ex Ante Probabilities of Mortgage Prepayment and Default", Real Estate Economics, Dec. 1998, vol. 26, No. 4, pp. 651-676.
Yücesan et al., "Distributed Web-Based Simulation Experiments for Optimization", Simulation Practice and Theory 9, Oct. 2001, pp. 73-90.
Zimmerman et al., "A Web-Based Platform for Experimental Investigation of Electric Power Auctions," Decision Support Systems, Jan. 1999, vol. 24, pp. 193-205.
Zoot—Instant Rules GUI, www.zootweb.com/instant_rules_GUI.html as printed Mar. 3, 2008.
Zoot—Rules Management GUI, www.zootweb.com/business_rules_GUI.html as printed Mar. 3, 2008.
Application as filed in U.S. Appl. No. 10/452,155, dated May 30, 2003.
Preliminary Amendment in U.S. Appl. No. 10/452,155, dated Sep. 15, 2003.
Office Action in U.S. Appl. No. 10/452,155, dated Jan. 25, 2008.
Examiner Interview Summary in U.S. Appl. No. 10/452,155, dated Jul. 23, 2008.
Response to Office Action in U.S. Appl. No. 10/452,155, dated Jul. 25, 2008.
Office Action in U.S. Appl. No. 10/452,155, dated Oct. 2, 2008.
Examiner Interview Summary in U.S. Appl. No. 10/452,155, dated Jan. 14, 2009.
Response to Office Action in U.S. Appl. No. 10/452,155, dated Apr. 2, 2009.
Examiner Interview Summary in U.S. Appl. No. 10/452,155, dated Jul. 21, 2009.
Notice of Allowance in U.S. Appl. No. 10/452,155, dated Aug. 19, 2009.
International Search Report for Application No. PCT/US2005/041814, dated Aug. 29, 2007.
International Preliminary Report on Patentability and Written Opinion for Application No. PCT/US2005/041814, dated Dec. 27, 2007.
International Search Report and Written Opinion for Application No. PCT/US2007/06070, dated Nov. 10, 2008.
Accelerated Examination Support Document in U.S. Appl. No. 12/718,936, dated Mar. 5, 2010.
Office Action in U.S. Appl. No. 12/718,936, dated May 26, 2010.
Notice of Allowance in U.S. Appl. No. 12/718,936, dated Jul. 26, 2010.
International Search Report and Written Opinion for Application No. PCT/US2018/016258, dated May 16, 2018.
International Preliminary Report on Patentability in Application No. PCT/US2018/016258, dated Aug. 15, 2019.

(56) References Cited

OTHER PUBLICATIONS

International Search Report and Written Opinion for Application No. PCT/US2018/061877, dated Mar. 8, 2019.
International Preliminary Report on Patentability in Application No. PCT/US2018/061877, dated Jun. 4, 2020.
International Search Report and Written Opinion for Application No. PCT/US2019/049377, dated Dec. 20, 2019.
Provisional Application as filed in U.S. Appl. No. 60/168,272, dated Dec. 1, 1999 in 14 pages.
Provisional Application as filed in U.S. Appl. No. 60/168,276, dated Dec. 1, 1999 in 82 pages.
Provisional Application as filed in U.S. Appl. No. 60/213,367, dated Jun. 23, 2000 in 20 pages.
Application as filed in U.S. Appl. No. 09/653,595, dated Aug. 31, 2000.
Application as filed in U.S. Appl. No. 09/790,453, dated Feb. 22, 2001.
Office Action in U.S. Appl. No. 09/790,453, dated Jan. 20, 2006.
Response to Office Action in U.S. Appl. No. 09/790,453, dated Apr. 20, 2006.
Office Action in U.S. Appl. No. 09/790,453, dated Jul. 11, 2006.
Response to Office Action in U.S. Appl. No. 09/790,453, dated Sep. 8, 2006.
Office Action in U.S. Appl. No. 09/790,453, dated Dec. 1, 2006.
Response to Office Action in U.S. Appl. No. 09/790,453, dated Mar. 1, 2007.
Office Action in U.S. Appl. No. 09/790,453, dated May 10, 2007.
Response to Office Action in U.S. Appl. No. 09/790,453, dated Nov. 8, 2007.
Response to Advisory Action in U.S. Appl. No. 09/790,453, dated Jan. 3, 2008.
Office Action in U.S. Appl. No. 09/790,453, dated Mar. 21, 2008.
Response to Office Action in U.S. Appl. No. 09/790,453, dated Jun. 3, 2008.
Application as filed in U.S. Appl. No. 10/183,135, filed Jun. 25, 2002.
Office Action in U.S. Appl. No. 10/183,135, dated Oct. 22, 2007.
Response to Office Action in U.S. Appl. No. 10/183,135, dated Jan. 22, 2008.
Final Office Action in U.S. Appl. No. 10/183,135, dated Apr. 14, 2008.
Response to Office Action in U.S. Appl. No. 10/183,135, dated Jun. 11, 2008.
Office Action in U.S. Appl. No. 10/183,135, dated Aug. 21, 2008.
Response to Office Action in U.S. Appl. No. 10/183,135, dated Dec. 22, 2008.
Office Action in U.S. Appl. No. 10/183,135, dated Feb. 26, 2009.
Office Action in U.S. Appl. No. 10/183,135, dated Aug. 18, 2009.
Office Action in U.S. Appl. No. 10/183,135, dated Feb. 19, 2010.
Final Office Action in U.S. Appl. No. 10/183,135, dated Sep. 22, 2010.
Office Action in U.S. Appl. No. 10/183,135, dated Mar. 25, 2011.
Notice of Allowance in U.S. Appl. No. 10/183,135, dated Aug. 15, 2011.
Office Action in U.S. Appl. No. 11/169,769, dated Mar. 24, 2010.
Application as Filed in U.S. Appl. No. 11/363,984, dated Feb. 27, 2006.
Office Action in in U.S. Appl. No. 11/363,984, dated Dec. 26, 2008.
International Search Report and Written Opinion for Application No. PCT/US2007/063822, dated Sep. 11, 2007.
International Search Report and Written Opinion for Application No. PCT/US2007/063823, dated Oct. 24, 2007.
International Search Report and Written Opinion for Application No. PCT/US2007/063824, dated Oct. 3, 2007.
Agarwal et al., "Determinants of Credit Card Delinquency and Bankruptcy: Macroeconomic Factors", Journal of Economics and Finance, 2003, vol. 27, pp. 75-84 (12 pages).
Credit Scoring Systems Used to Measure Bankruptcy Risk. (1991). Credit Risk Management Report, 1(2), N/A. Retrieved from https://dialog.proquest.com/professional/docview/1078503725?accountid= 131444, pp. 7.
Delamaire et al., "Credit Card Fraud and Detection Techniques: A Review", Banks and Bank Systems, vol. 4, No. 2, 2009, pp. 57-68.
Gustafsson et al., "Always Best Connected", 3G Mobile Network Technologies and Experiences, IEEE Wireless Communications, Feb. 28, 2003, vol. 10, No. 1, pp. 49-55.
Hu et al. "Forecasting Identity Theft Victims: Analyzing Characteristics and Preventive Actions through Machine Learning Approaches", Victims & Offenders, 2021, vol. 16, No. 4, pp. 465-494.
Nikravesh et al., "Fuzzy Queries, Search, and Decision Support System", Soft Computing, Aug. 2002, vol. 6, No. 5, pp. 373-399.
Poon, Martha Ann, "What Lenders See—A History of the Fair Isaac Scorecard", UCSD, ProQuest Dissertations Publishing, 2012, pp. 5. [Abstract Only].
Ralston et al., "Lending Procedures and the Viability-Social Objectives Conflict in Credit Unions", The International Journal of Bank Marketing, 2003, vol. 21, No. 6/7, pp. 304-311 (14 pages).
Skanderson, David M., "Managing Discrimination Risk of Machine Learnng and AI Models", ABA Journal of Labor & Employment Law, 2021, pp. 339-360.
Solapurkar, Prajakta, "Building Secure Healthcare Services Using OAuth 2.0 and JSON Web Token in IOT Cloud Scenario", IEEE, 2nd International Conference on Contemporary Computing and Informatics (ic3i), 2016, pp. 99-104.

\* cited by examiner

REPORT EXISTENCE MONITORING

INCORPORATION BY REFERENCE TO ANY PRIORITY APPLICATIONS

This application is a continuation of U.S. patent application Ser. No. 16/037,221, filed Jul. 17, 2018, which is a continuation of U.S. patent application Ser. No. 12/349,455, filed Jan. 6, 2009. Any and all applications for which a foreign or domestic priority claim is identified in the Application Data Sheet as filed with the present application are hereby incorporated by reference under 37 CFR 1.57.

BACKGROUND OF THE INVENTION

Field of the Invention

This invention relates to systems and methods for detecting the existence of a credit report.

Description of the Related Art

Identity theft is the act of acquiring a consumer's personal information, such as an account number, driver's license, health insurance card, or Social Security number, and using the information to commit fraud or theft. Identity theft is one of the fastest growing crimes in the nation. In 2007, the Federal Trade Commission estimated that as many as 9 million Americans have their identities stolen each year. Identity thieves may rent an apartment, obtain a credit card, clone an ATM or debit card and make electronic withdrawals, take out major loans and not pay off the lender, and establish a telephone account, as well as engage in a number of other fraudulent activities. A consumer may not find out about the identity theft until a debt collector contacts the consumer.

Consumers may enroll in credit monitoring services to protect their identities from theft. Credit monitoring services periodically check the credit report of the enrolled consumer and provide the enrolled consumer with updated credit reports so that the consumer may detect activities that appear fraudulent. However, enrollment in those services requires the existence of a credit report. If a credit report does not exist for a consumer, for example the elderly or expatriates, then the consumer cannot enroll in the service. Also, if the report is unavailable at the time enrollment is attempted, because of a system glitch or a data error, for example, then a consumer would also be refused enrollment. Thus, these consumers would be left without the protection of a credit monitoring service, which may result in a theft of their identity not being immediately noticed.

SUMMARY OF THE INVENTION

The systems, methods, and devices of the invention each have several aspects, no single one of which is solely responsible for its desirable attributes. Without limiting the scope of the invention, certain features will now be discussed briefly.

In one embodiment, a computerized method of enrolling a consumer in a credit monitoring service, the credit monitoring service providing periodic notifications to enrolled consumers regarding changes to their respective credit reports, comprises (a) providing a user interface to a consumer, (b) receiving enrollment information from the consumer via the user interface, the enrollment information comprising one or more of: a name, a social security number, and an address of the consumer, (c) transmitting a credit report request to a credit bureau, the credit report request comprising at least some of the enrollment information, (d) receiving an indication that the credit bureau did not locate a credit report of the consumer, (e) notifying the consumer that a credit report was not located by the credit bureau, (f) after a predetermined time, requesting a credit report of the consumer from the credit bureau, and, if a credit report is not returned in response to the request, returning to step (f), or, if a credit report is returned in response to the request, continuing enrollment of the consumer in the credit monitoring service.

In one embodiment, a computerized method of enrolling a consumer in a service that requires the existence of a credit report comprises receiving an indication from one or more credit bureaus that a credit report for the consumer is not available, periodically requesting a credit report of the consumer from the one or more credit bureaus, and, if a credit report of the consumer is located, continuing enrollment of the consumer in the service.

In one embodiment, a computerized method of monitoring the existence of a credit report for a consumer comprises requesting a credit report for a consumer from one or more credit bureaus, receiving an indication from the one or more credit bureaus that a credit report for the consumer is not available, and, after a predetermined time period, requesting a credit report for the consumer from the one or more credit bureaus, receiving an indication from the one or more credit bureaus that a credit report for the consumer is not available, and repeating the request of a credit report for the consumer until a credit report for the consumer is available.

In one embodiment, a system for enrolling a consumer in a credit monitoring service comprises an enrollment module configured to receive enrollment information for a consumer and to enroll the consumer in a credit monitoring service and a report existence module configured to request a credit report of the consumer from one or more credit bureaus wherein in response to receiving an indication that no credit report is available for the consumer, the report existence module is configured to periodically re-request a credit report of the consumer and, in response to receiving an indication that a credit report is available for the consumer, continuing enrollment of the consumer in the credit monitoring service.

DETAILED DESCRIPTION OF THE PREFERRED EMBODIMENT

Embodiments of the invention will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 1A:
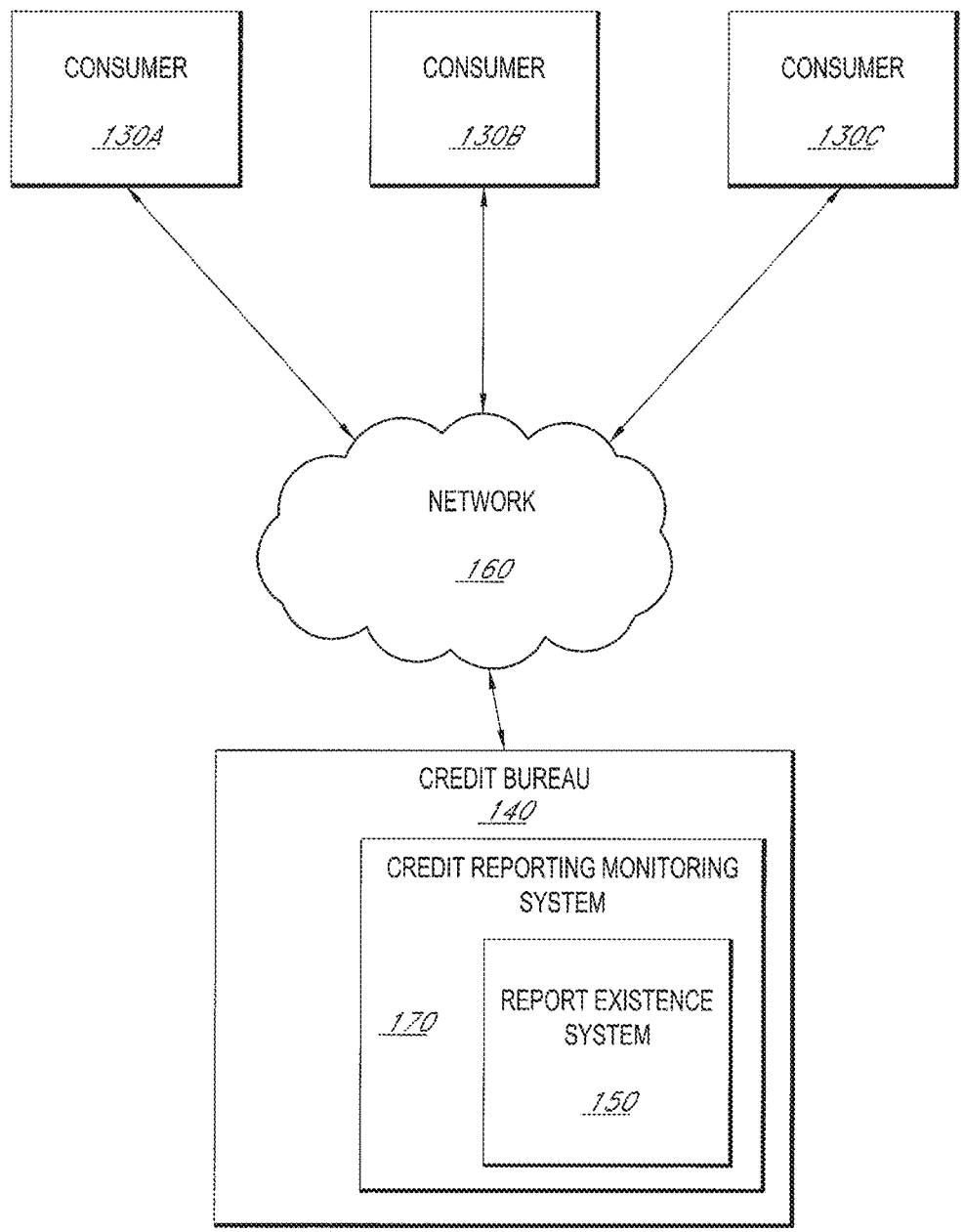
FIG. 1A is a block diagram illustrating one embodiment of a credit bureau in communication with one or more consumer computing devices via a network.

FIG. 1A is a block diagram illustrating one embodiment of a credit bureau 140 in communication with one or more consumer computing devices 130A, 130B, 130C (also referred to herein as simply the "consumer 130A, 130B, 130C" or the "consumers 130A, 130B, 130C"), via a network 160. Computing devices, as used herein, may include desktop computers, laptops, servers, personal digital assistants, cellular phones, and/or any other computing device. The network 160 may comprise one or more wired or wireless networks or both, such as any combination of one or more LANs, WANs, MANs, or the Internet.

In the embodiment of FIG. 1A, a credit bureau 140 includes a credit report monitoring system 170. The credit bureau 140, or more specifically, the credit monitoring system 170, receives enrollment information from a consumer 130A, 130B, or 130C, who wishes to enroll in a credit report monitoring service. As used herein, enrollment information comprises any information that may be used to establish the identity and/or to obtain a credit report of a consumer 130A, 130B, 130C, and may include, for example, name, previous names, dates of birth, address, previous addresses, Social Security number, account numbers, credit card numbers, and/or driver's license number.

In general, a credit monitoring service (e.g., provided by the credit report monitoring system 170) allows a consumer, once enrolled in the monitoring service, to access an updated version of their credit report at any time. Thus, a consumer 130A, 130B, 130C can review their credit score and credit-related activities that are reported on a credit report as frequently as they would like, such as daily, weekly, monthly, etc. In addition, credit monitoring services may provide notifications, such as messages on a web based user interface, emails, and/or text messages, to the enrolled consumer when there are changes to the consumer's credit report, or possibly only when there are certain types of changes to the consumer's credit report. Thus, enrolled consumer may be alerted of fraudulent use of their identity promptly after the fraudulent use occurs, so that the fraudulent use may be immediately dealt with and further fraudulent uses may be limited or prevented. Credit monitoring services may be especially beneficial to consumers that have had their personal information lost or stolen as part of a data breach, which typically involves the loss or theft of the personal data of hundreds or thousands of consumers.

However, in order to enroll in a credit monitoring service (e.g., provided by the credit report monitoring system 170), the consumer 130A, 130B, 130C often must have a credit report, and there are several reasons why the credit report may not be available for a consumer. These reasons generally fall into two categories: 1) the consumer does not have a credit report, which includes those consumers that have never had a credit report and those consumers that have previously had a credit report but currently do not have a credit report, due to extended periods of no activity in their credit files, such as the elderly and expatriates, for example, and 2) the credit report is not currently available, such as due to a system glitch or a data error in a credit bureau 140, for example.

A report existence system 150 may periodically check for the existence of a credit report for a consumer 130A, 130B, 130C. Upon finding a credit report for a consumer 130A, 130B, 130C, the report existence system 150 may provide the report to the credit report monitoring system 170 and/or the consumer 130A, 130B, 130C. The credit report monitoring system 170 may complete the enrollment of the consumer 130A, 130B, 130C after receiving the credit report. The report existence system 150 may also notify the consumer 130A, 130B, 130C when no credit report is found.

For example, a consumer named Bill Jones has served abroad in the military for 8 years before returning to the U.S. Upon his return, Bill does not have a credit report on record at any of the credit bureaus. Bill typically donates to a charity for fallen soldiers. Unfortunately, the charity to which Bill donates had a data breach in which personal information of the charity's donors were stolen. Bill, after being advised of the data breach, wishes to enroll in a credit monitoring service. However, because Bill does not have a credit report, he is not qualified to enroll in a credit monitoring service. Bill can choose to periodically attempt to enroll in a credit monitoring service, in an attempt to determine if his personal information has been used to open a new credit account, for example, which would result in creation of a credit report for Bill. However, the manual re-application for a credit monitoring service may be tedious and will likely not be performed frequently. Thus, Bill may not be aware of fraudulent use of his personal information until weeks, months, or years after the fraudulent use occurs. Thus, Bill needs some way to keep apprised of fraudulent use of his personal information (other than enrolling in a credit monitoring service for which he is currently not eligible for). As discussed in further detail below a report existence system 150 advantageously periodically determines if a credit report has been created for a consumer and, in response to detecting a credit report for a consumer that previously did not have a credit report, alerts the consumer of the credit report creation and may provide the consumer with an opportunity to complete enrollment in a credit monitoring service. With such a report existence monitoring service, Bill does not need to repeatedly attempt to enroll in the credit monitoring service in order to determine if a credit report using his personal information has been created. Rather, the report existence system 150 automatically detects when a credit report has been create for Bill and notifies him of such event.

ILLUSTRATIVE EMBODIMENTS

In the embodiment of FIG. 1A, a consumer 130A represents an exemplary victim of a data breach that wishes to enroll in a credit monitoring service, (e.g., provided by the credit report monitoring system 170), a consumer 130B represents an exemplary person who knows that they do not have a credit report, such as an elderly person or an expatriate, and a consumer 130C represents a person that has lost one or more documents that contains personally identifying information, such as a driver's license, credit card, Social Security card, or a wallet or a purse that contains such personally identifying information. Additionally, other consumers that are interested in enrolling in a credit monitoring service may have been a victim of identity theft in the past or just have a great deal of concern for their credit report.

In one embodiment, the credit bureau 140 is an entity that collects information from various sources and provides consumer credit information on individual consumers. The credit bureau 140 may be Experian, TransUnion, Equifax, any agency thereof, or any other entity that provides credit reports. As used herein, credit report or credit file is defined to include any credit-related data, including data from credit files, credit reports, and any other credit-related information. For ease of description, certain exemplary systems and methods are described herein with reference to credit reports. These references to a credit report should be interpreted to include embodiments directed to any subset of credit data in a credit file or a credit report, soft inquiry data, or any additional credit data that may not be included in a credit report.

The credit bureau 140 may comprise one or more computing devices. Additionally, the credit bureau 140 may be configured to request and/or collect information, such as credit data and/or consumer information, from various sources, including other credit bureaus, and then store the information on one or more computer readable medium. The credit bureau 140 may be configured to respond to requests and/or queries from a consumer 130 or credit report monitoring system 170, and may also be configured to perform other operations, such as enrolling a consumer in a credit report monitoring service (e.g., provided by the credit report monitoring system 170).

The credit bureau 140 may be configured to request and/or receive enrollment information from one or more consumers 130A, 130B, 130C. In one embodiment, the credit bureau 140 requests the enrollment information via a user interface that is accessible over a network, and the consumer provides the enrollment information on the web user interface. In other embodiments, the one or more consumers 130A, 130B, 130C may provide the enrollment information through communication with an employee of credit monitoring service, such as through normal mail or phone conversation, for example, and the employee may then access a user interface to provide the information to the credit bureau 140.

In some embodiments, the credit bureau 140 comprises a credit report monitoring system 170. The credit report monitoring system 170 may include one or more computing devices. The credit report monitoring system 170 may receive enrollment information from a consumer 130A, 130B, 130C via the credit bureau 140, or via direct communication between the one or more consumers 130A, 130B, 130C using a web interface provided by the credit report monitoring system 170, the telephone, or direct communication with an employee of the credit report monitoring service. In other embodiments, the information may be provided through a storage device, such as an optical disk a disk drive, a jump drive, and/or a hard drive. Once the credit report monitoring system receives the information, it may store a copy of part of or all of the information in a computer-readable storage medium, such as another hard drive, optical disk, and/or other memory.

In one embodiment, the credit report monitoring system 170 is configured to monitor the credit report of an enrolled consumer and provide alerts to the enrolled consumer. The credit report monitoring system 170 may be configured to access a consumer's credit report (such as by requesting a credit report from a credit bureau 140) and identify alerts for the consumer on a periodic basis, such as daily, every three days, weekly, bi-weekly, monthly, bi-monthly, or according to any other period of time. Depending on the embodiment, the period may be selected by the consumer 130A, 130B, 130C. Upon finding suspicious activity in the credit report of one or more consumers 130A, 130B, 130C, the credit report monitoring system 170 may be configured to notify the respective one or more consumers 130A, 130B, 130C of the suspicious activity. The notification may be sent via any correspondence, such as email, paper mail, phone call, first person conversation, a web interface, fax, and/or SMS message. The method of sending the notification may be selectively chosen by the one or more consumers 130A, 130B, 130C. Suspicious activity may include the opening of a new revolving or installment account, opening new credit cards, applying for a loan, opening a new telephone account, or making new charges on existing accounts that are larger than the typical charges made on the account, the availability of a credit report when no credit report was available before, and/or any other changes between a current credit report and one or more previous credit reports.

In the embodiment of FIG. 1A, the credit report monitoring system 170 includes a report existence system 150. The report existence system 150 may include one or more computing devices. Depending on the embodiment, the report existence system 150 may be configured to communicate with one or more credit monitoring systems 170 and/or one or more credit bureaus 140. This communication may take place via a network, such as a wired or wireless network.

The report existence system 150 may be configured to request a credit report for the consumer 130A, 130B, 130C, either once or multiple times, such as periodic requests. The report existence system 150 may also evaluate a reply to a credit report request, determine when no credit report exists for a consumer 130, and initiate storage of that information and related information, such as the time of determination and any returned credit report. The report existence system 150 may also return this information (and a credit report, if found) either by request or automatically, to one or more credit bureaus 140, one or more credit report monitoring systems 170, and/or the respective consumer 130A, 130B, 130C.

In FIG. 1A, one or more consumers attempt to enroll in a credit report monitoring service 170 provided by the credit bureau 140 by transmitting enrollment information over a web-based user interface, for example. As noted above, in order for a consumer 130A, 130B, 130C to enroll in a credit monitoring service (e.g., provided by the credit report monitoring system 170), the consumer may need to have a credit report, but a credit report may not be available. Thus, those consumers 130A, 130B, 130C for whom a credit report cannot be located may be denied enrollment in the credit report monitoring service 170.

Advantageously, for those consumers 130A, 130B, 130C that do not currently have a credit report, the report existence system 150 may periodically check for the existence of a credit report. The period may be any interval of time, such as one day, five days, one week, 2 weeks, one month, two months, or any other period of time. In one embodiment, the period may be selectively chosen by the one or more consumers 130A, 130B, 130C. When a credit report for the one or more consumers 130A, 130B, 130C is located by the report existence system 150, the credit report monitoring system 170 may be notified by the report existence system 150. In one embodiment, when the report existence system 150 returns a credit report for one or more consumers 130A, 130B, 130C to the credit report monitoring system 170, the credit report monitoring system 170 automatically completes the enrollment of the respective one or more consumers 130A, 130B, 130C. The report monitoring system 170 may notify the respective one or more consumers 130A, 130B, 130C of their successful enrollment in the credit report monitoring service. In some embodiments, if no credit report is located when the report existence system requests a credit report for a consumer 130A, 130B, 130C, the report existence system 150 may notify the respective consumer 130A, 130B, 130C that no credit report exists. Such a notification may be transmitted each time the report existence system 150 checks for the existence of a credit report, or according to some other schedule, such as monthly, or by request from the consumer 130A, 130B, 130C.

Figure 1B:
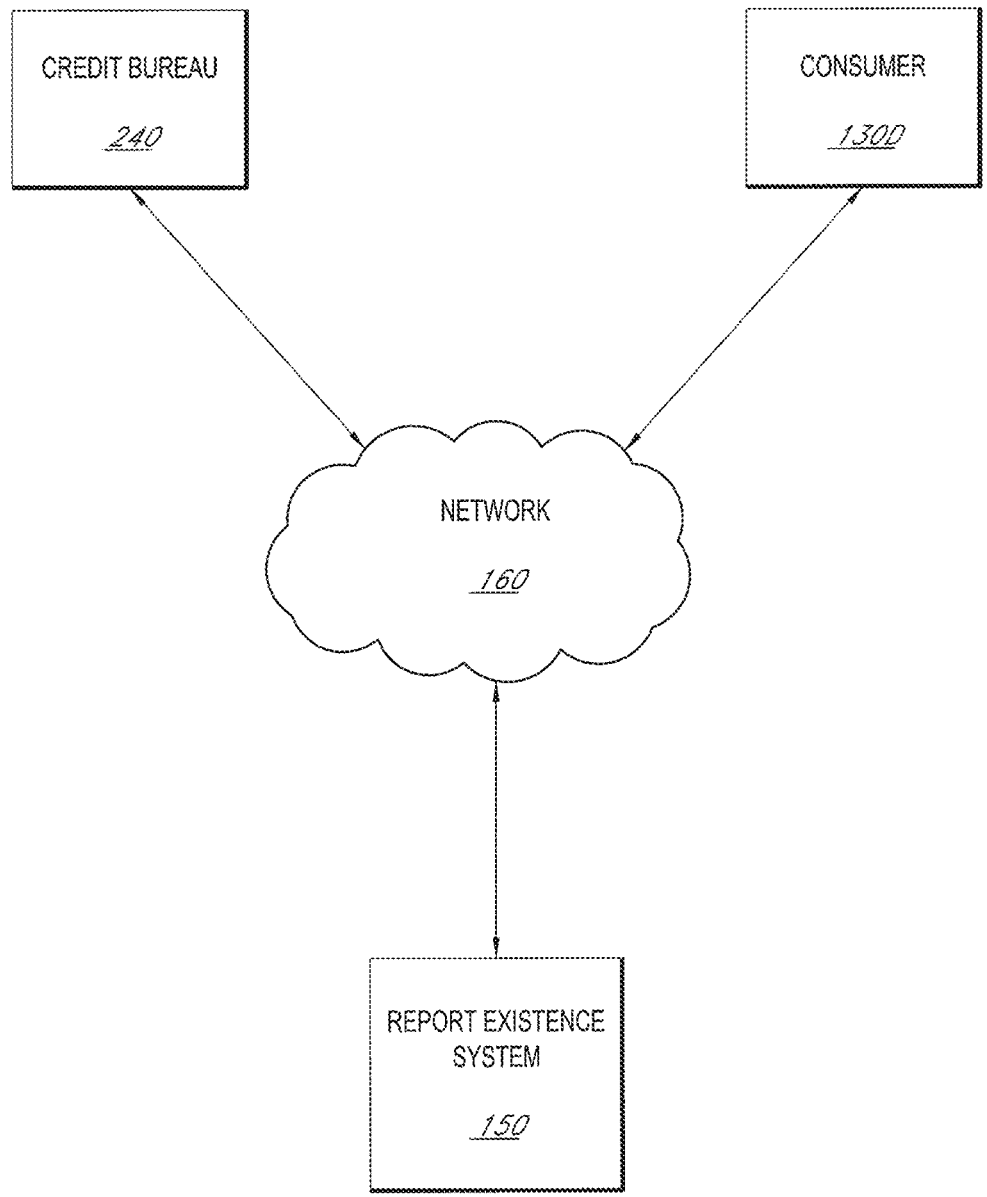
FIG. 1B is a block diagram illustrating one embodiment of a report existence system in communication with a consumer and a credit bureau via a network.

FIG. 1B is a block diagram illustrating one embodiment of a report existence system 150 in communication with a consumer 130D and a credit bureau 140 via the network 160. This embodiment may allow consumers 130D that currently do not have a credit report to monitor the lack of existence of a credit report. These consumers 130D may include those that have never had a credit report, for example children, and those consumers that have previously had a credit report but currently do not have a credit report due to extended periods of no activity in their credit files, for example, such as might be the case for the elderly and expatriates. In the embodiment of FIG. 1B, the report existence system 150 may receive enrollment information directly from the consumer 130 via a web user interface that the consumer 130D may access over the network 160. The user interface may allow the consumer to provide enrollment information to the user interface through features on the interface, such as text entry fields, drop down menus, check boxes, and or buttons, and then the interface may allow the user to submit the information to the report existence system 150. In other embodiments, the enrollment information is received from a credit report monitoring system 170 (not shown) and/or a credit bureau 140.

After receiving the enrollment information from the consumer 130D, the report existence system 150 may send a request to the credit bureau 140, for example over the network, for a credit report for the consumer 130D. In one embodiment, the requests are sent periodically, for example every day. In other embodiments, periodic requests are sent hourly, weekly, monthly, or any other period of time.

Additionally, in one embodiment periodic notifications may be transmitted to the consumer 130D indicating that a credit report was not located. If a credit report was located, the report existence system 150 may provide a notification that a credit report was located and/or a copy of the located credit report.

In one embodiment, if a credit report for the consumer 130D was located then the report existence system 150 sends the consumer 130D information regarding fraud resolution services and/or credit monitoring services. Depending on the embodiment, the report existence system 150 may also be included in or affiliated with a credit bureau 140 and/or a credit report monitoring system 170. Advantageously, this embodiment allows those consumers who know that they do not have a credit report to be immediately notified if a credit report is created using their identification information and respond quickly to limit the effects of the unauthorized use of their identification information.

Figure 1C:
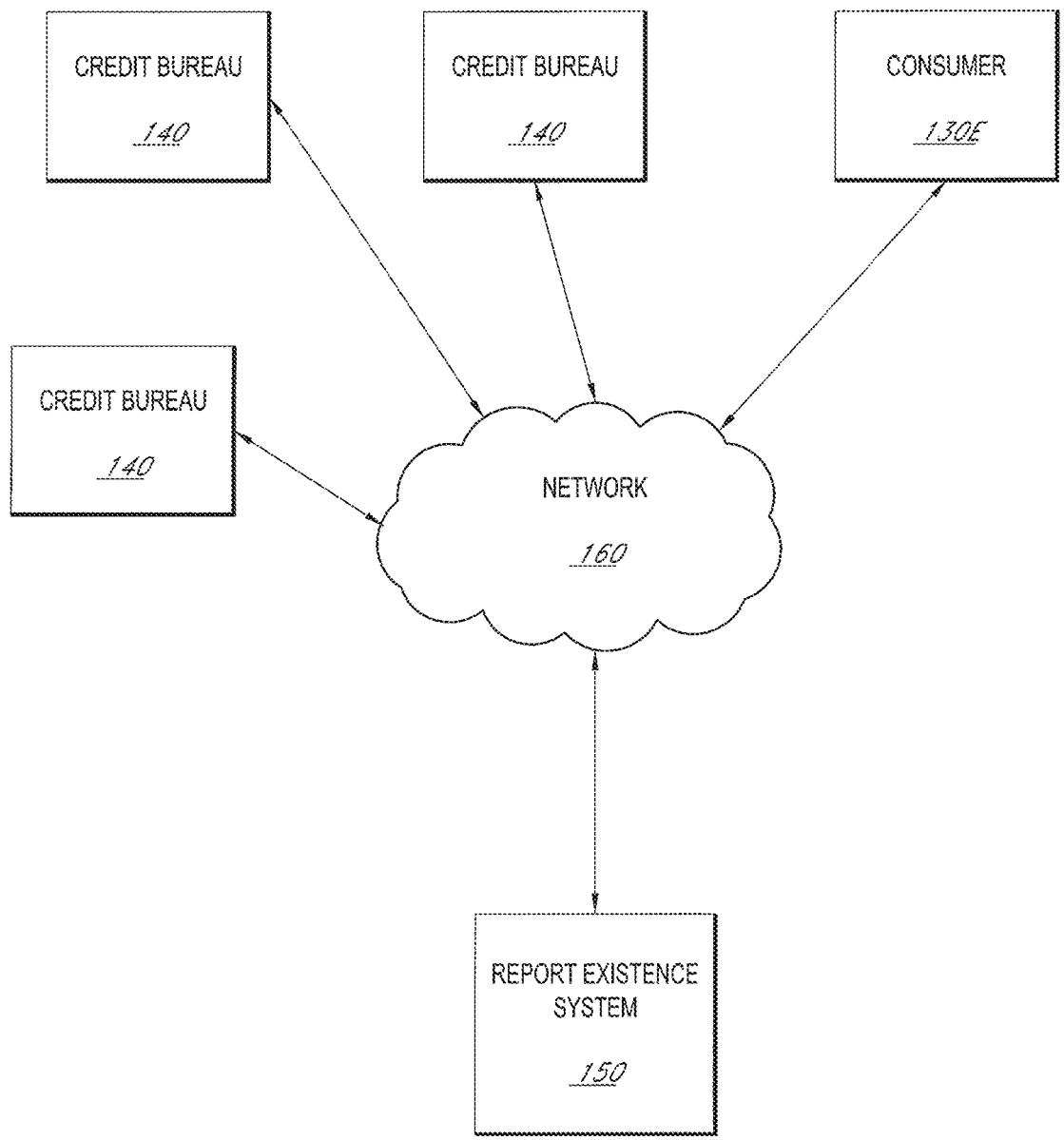
FIG. 1C is a block diagram illustrating one embodiment of a report existence system in communication with a consumer and a plurality of credit bureaus.

FIG. 1C is a block diagram illustrating an exemplary embodiment of a report existence system 150 in communication with a consumer 130E and a plurality of credit bureaus 140. The plurality of credit bureaus 140 may comprise Experian, TransUnion, Equifax, any agency thereof, or any other entity that provides credit-related data. In this embodiment, the report existence system 150 may send a request, and, depending on the embodiment, periodically requests, for a credit report of the consumer 130E to one or more of the plurality credit bureaus 140. In one embodiment, a request for a credit report is transmitted to multiple, e.g., two, three, or more, of the credit bureaus 140. The one or more credit bureaus 140 may reply to the report existence system with the credit report for the consumer 130 and/or a notification that a credit report was found or with a notification that no credit report for the consumer 130 exists.

In some circumstances, one credit bureau 140 may have a credit report for the consumer 130 while other credit bureaus 140 may not have a credit report for the consumer 130. Thus, accessing a plurality of credit bureaus 140 may advantageously provide a more accurate assessment of the existence of a credit report for the consumer 130. Additionally, if the credit bureaus 140 take different amounts of time to receive and process credit data before making a new credit report available to requesting entities, by requesting credit reports from a plurality of credit bureaus 140 the report existence system 150 may more quickly be notified of the existence of a credit report for the consumer 130E by receiving the credit report from the credit bureau 140 that most quickly makes available the credit report for the consumer 130.

In one embodiment, the report existence system 150 sends the consumer 130 a notification that one or more credit bureaus 140 found a credit report and/or one or more credit bureaus 140 did not find a credit report. In embodiments wherein a credit report monitoring system 170 sends a request for a credit report to the report existence system 150, the report existence system 150 may send a credit report to the credit report monitoring system if a credit report is ever available.

System Information

Figure 2:
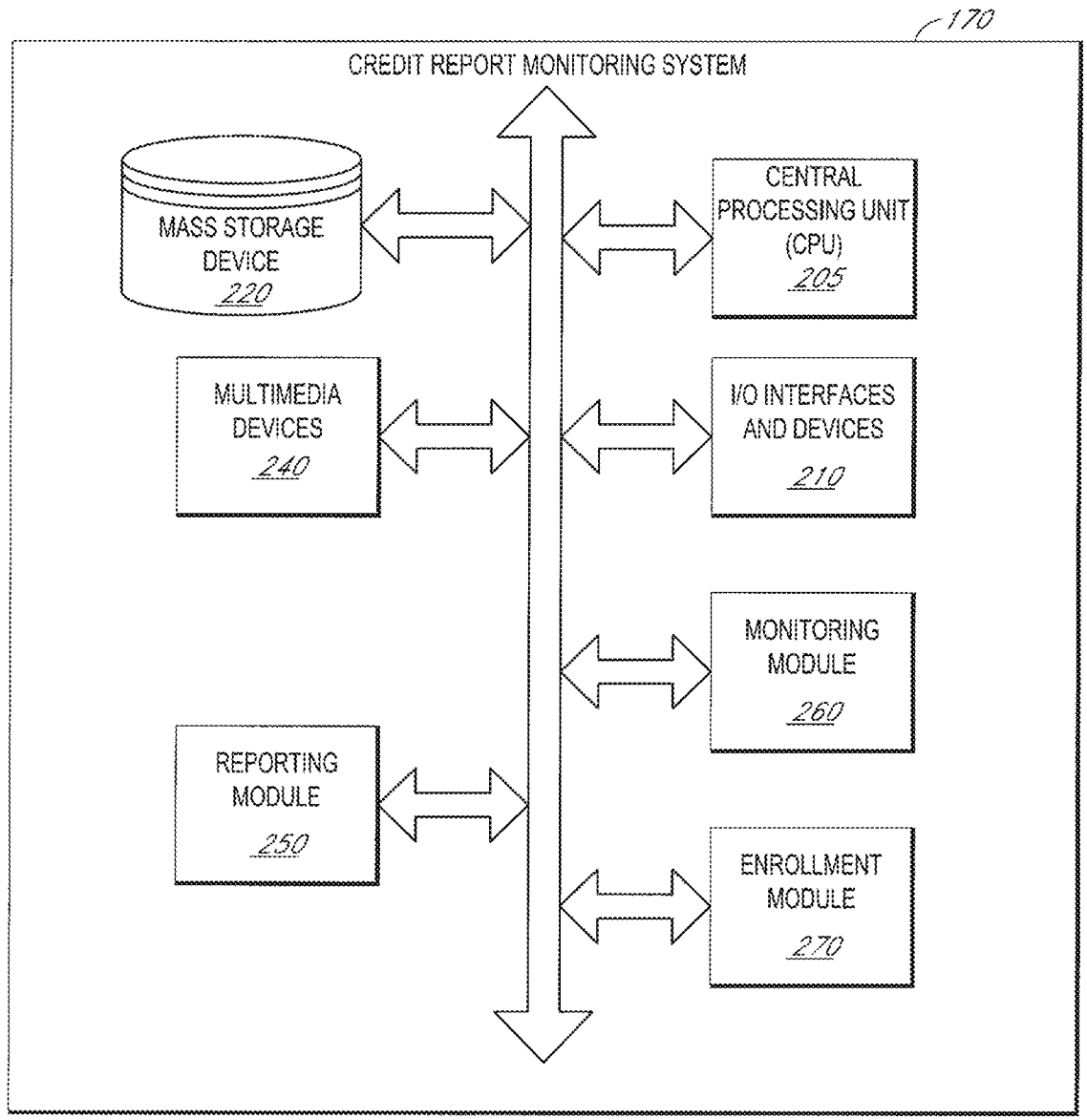
FIG. 2 is a block diagram of one embodiment of a credit report monitoring system.

FIG. 2 is a block diagram of one embodiment of a credit report monitoring system 170, also referred to herein as simply "monitoring system." The credit report monitoring system 170 may be operated by a monitor provider, which in one exemplary embodiment includes a credit bureau. The monitoring system may further comprise human personnel that interact with the computing devices of the monitoring system 170.

In one embodiment, the monitoring system 170 is configured to interface with multiple devices and/or data sources such as in the exemplary network configuration of FIGS. 1A, 1B, and 1C. The monitoring system 170 may be configured to implement certain systems and methods herein. For example, in one embodiment the monitoring system 170 may be configured to periodically request a credit file associated with a consumer 130 from one or more credit bureaus 140. The functionality provided for in the components and modules of the monitoring system 170 may be combined into fewer components and modules or further separated into additional components and modules.

In general, the word modules, as used herein, refers to logic embodied in hardware or firmware, or to a collection of software instructions, possibly having entry and exit points, written in a programming language such as, for example, C, C++, C#. A software modules may be complied and linked into an executable program, installed in a dynamic link library, or may be written in an interpreted programming language such as, for example, BASIC, Java, Perl, or Python. It will be appreciated that software modules may be callable from other modules or from themselves or may be invoked in response to detected events and interrupts, or both. Software instructions may be embedded in firmware, such as an EPROM. It will be further appreciated that hardware modules may be comprised of connected logic units, such as programmable gate arrays or processors. The modules described herein are preferably implemented as software modules, but may be represented in hardware or firmware. Generally, the modules described herein refer to logical modules that may be combined with other modules or devices into sub-modules despite their physical organization or storage.

In one embodiment, the monitoring system 170 includes, for example, a server or personal computer that is IBM, Macintosh, or Linux/Unix compatible. In another embodiment, the monitoring system 170 includes a laptop computer, smart phone, personal digital assistant, or other computing device. The monitoring system 170 may include a memory, such as random access memory ("RAM") for temporary storage of information, a read only memory ("ROM") for permanent storage of information, and a mass storage device 220, such as a hard drive, diskette, optical media storage device, or USB flash drive. In certain embodiments, the mass storage device 220 stores the enrollment information for each of a plurality of consumers 130. Typically, the modules of the monitoring system are in communication with each other via a standards based bus system. In different embodiments, the standards based bus system could be Peripheral Component Interconnect (PCI), Microchannel, SCSI, Industrial Standard Architecture (ISA), and Extended ISA (EISA) architectures, for example.

The monitoring system 170 is generally controlled and coordinated by operating system software, such as Windows 95, 98, NT, 2000, XP, Vista, SunOS, Solaris, Blackberry OS, or other compatible operating systems. In Macintosh systems, the operating system may be any available operating system, such as MAC OS X. In other embodiments, the monitoring system 170 may be controlled by a proprietary operating system. Conventional operating systems control and schedule computer processes for execution, perform memory management, provide file systems, networking, and I/O services, and provide a user interface, such as a graphical user interface ("GUI"), among other functions.

The exemplary monitoring system 170 includes one or more commonly available input/output (I/O) interfaces and devices 210, such as a keyboard, mouse, touchpad, and printer. In one embodiment, the I/O interfaces and devices 210 include one or more display devices, such as a monitor, that allow the visual presentation of data to a user. More particularly, a display device provides for the presentation of GUIs, application software data, and multimedia presentations, for example. The monitoring system 170 may also include one or more multimedia devices 240, such as speakers, video cards, graphics accelerators, and microphones, for example. In one embodiment, the I/O interfaces and devices 210 comprise devices that are in communication with modules of the monitoring system 170 via a network, such as the network 160 or any local area network, including secured local area networks, or any combination thereof.

In the embodiment of FIG. 2, the monitoring system 170 also includes application modules that may be executed by the CPU 205. More particularly, the application modules may include an enrollment module 270, a monitoring module 260, and a reporting module 250. In general, the enrollment module 270 may be configured to interact with consumers 130 (e.g., FIGS. 1A, 1B, 1C) in order to receive enrollment information from the consumers 130 and enroll the consumers 130 in a credit report monitoring service, and may use the I/O interfaces and devices 210 to interface with consumers. The enrollment module may also be configured to initiate storage of any received enrollment information in the mass storage device 220. For example, embodiment, the enrollment module 270 may provide a user interface that consumers may access using a web browser, and the user interface is configured to receive enrollment information and transmit it back to the enrollment module 270. Upon receipt of the enrollment information, the enrollment module 270 may initiate storage of the enrollment information in the mass storage device 220, which may include providing the enrollment information to the standards bus system.

The monitoring module 260 may be configured to determine if changes have been made to a consumer's credit report or determine if a credit report exists for a consumer. In one exemplary embodiment, the monitoring module 260 periodically transmits a request to and receives a reply from one or more credit bureaus 140 over a network 160 (not shown in FIG. 2) using the I/O Interfaces and Devices 210. The request may be for a credit report for one or more consumers, and the reply may be a notification that no credit report was available for one or more consumers, a notification that a credit report was located for one or more consumers, and/or a credit report for one or more consumers. The monitoring module 260 may initiate storage of any and all replies from the one or more credit bureaus 140 in the mass storage device 220. The monitoring module 260 may also initiate retrieval of previous replies received for one or more consumers from the mass storage device 220. Upon receipt of the previous replies, the monitoring module 260 may evaluate the replies, for example by comparing and/or contrasting the most recent reply from the one or more credit bureaus 140 for the a consumer with one or more previously received reply from the one or more credit bureaus 140 for the respective consumer and by detecting any changes between the replies received for the one or more consumers. For example, the monitoring module 260 may be configured to detect the opening of a new bank account, the obtaining of a new loan, or the obtaining of a new credit card that was not included in a previous reply from a credit bureau 140. The monitoring module 260 may also be configured to detect the existence of a credit report for a consumer when no credit report existed previously, for example by detecting the receipt of a credit report when no credit report had previously been received. The monitoring module 260 may initiate the storage of any changes it detects in the mass storage device 220 and/or provide the detected changes to the reporting module 250.

The reporting module 250 may provide notifications to consumers 130 and/or other authorized entities regarding changes in a credit report, the existence of a credit report for the respective consumer, and/or the status of the respective consumer's enrollment in a credit monitoring service. The reporting module 250 may provide this notification through the I/O interfaces and devices, such as by initiating the transmission of an email to the consumers and/or other authorized entities. The notification may be provided according to a predetermined schedule, such as a predetermined period of time and/or in response to detecting suspicious activity. The reporting module 250 may also provide notification through a user interface that consumers and/or authorized entities may access using a web browser. For example, consumers may be able to select a link on a web page provided by a credit report monitoring system 170 that may bring them to a user interface that indicates the results of one or more credit report requests for the respective consumer and/or the results of an evaluation of any returned credit reports.

In other embodiments, the monitoring system 170 may include fewer or additional modules and components, the modules may be incorporated into other computing devices, and/or the modules may be combined into fewer components and modules or further separated into additional components and modules. For example, in the embodiment of FIG. 1C, the report existence monitor 150 may include the reporting module 250 and the monitoring module 260, and/or the monitoring module may be further divided into a monitoring module and a report existence module. Each of these application modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

Overall Process Flow

Figure 3:
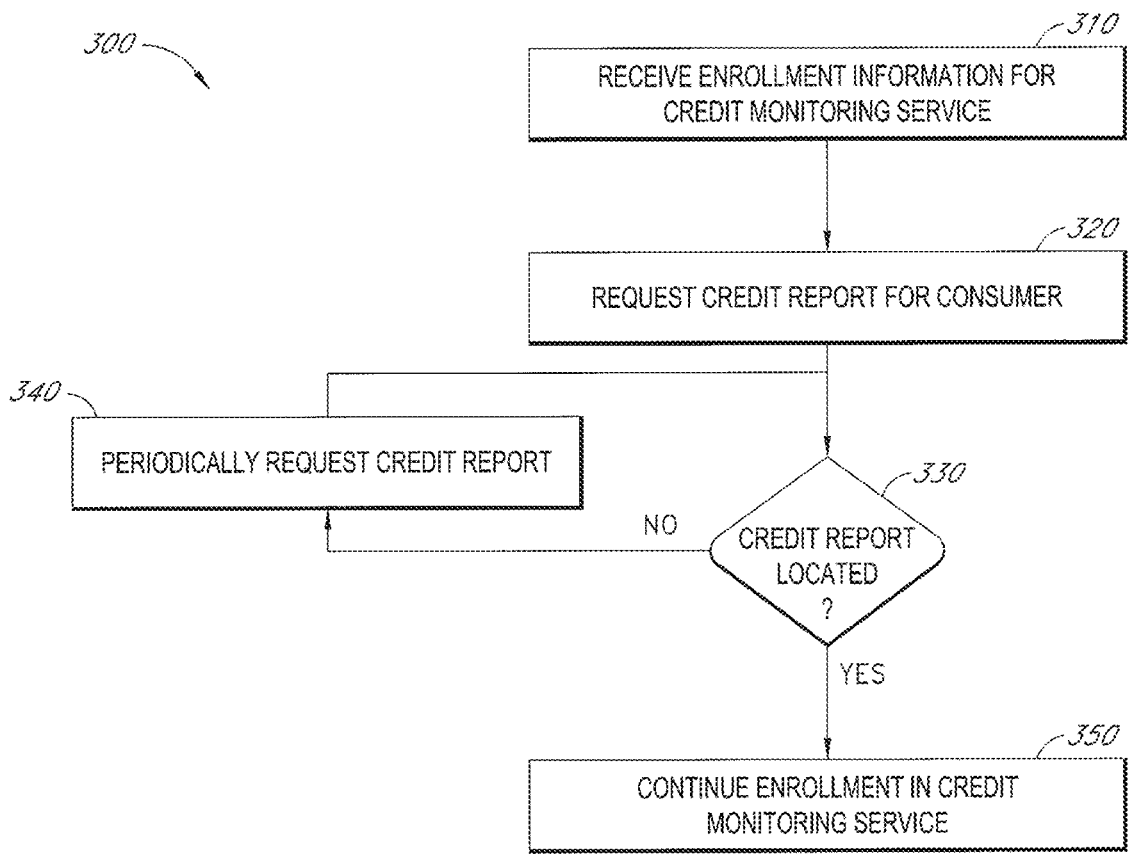
FIG. 3 is a flowchart illustrating one embodiment of a method of enrolling a consumer in a credit report monitoring service.

FIG. 3 is a flowchart 300 illustrating one embodiment of a method of enrolling a consumer 130 (e.g., FIG. 1A) in a credit report monitoring service. The flowchart of FIG. 3 illustrates exemplary processes for enrollment of consumers in a credit monitoring service and receiving a credit report for a consumer. The method of FIG. 3 may be performed by the credit report monitoring system 170, the report existence system 150, and/or any other suitable computing device. Depending on the embodiment, the method of FIG. 3 may include fewer or additional blocks and the blocks may be performed in an order that is different than illustrated in FIG. 3.

Beginning in block 310, enrollment information for a consumer 130 is received. For example, the credit report monitoring system 170 (e.g., FIG. 1A) may generate a user interface including a form that receives enrollment information from consumers and transmits the user interface to the consumer via the network 160. The consumer may receive the enrollment user interface in response to selecting another link on another web site indicating the consumer's desire to enroll in a credit monitoring service. In other embodiments, a request for enrollment information may be made via other mediums, such as email, SMS message, facsimile, telephone call (which may or may not be automated), and/or paper letter, for example.

In block 320 the credit report monitoring system 170 requests a credit report for the consumer. Depending on the embodiment, the request may sent to one or more credit bureaus 140, and the request may include all or part of the enrollment information provided by the consumer. The request may be sent via the network 160, for example, or via other mediums, such as facsimile, telephone call (which may or may not be automated), and/or paper letter.

In block 330, a determination is made if a credit report was located. For example, the credit report monitoring system 170 may receive a reply from a credit bureau 140 which may include a notification that the credit bureau 140 could not locate a credit report for the consumer 130 or which may include a notification that a credit report was located (which may further include the credit report). The credit report monitoring system 170 may evaluate the reply to determine if the credit bureau 140 located a credit report for the consumer 130.

In block 340, if no credit report was located, a credit report may be periodically requested. For example, a report existence system 150 may periodically sends a request to one or more credit bureaus 140 for a credit report of the consumer 130 via the network 160. Depending one the embodiment, the period may be hourly, daily, bi-weekly, monthly bi-monthly, or any other period of time. After a request is made, in block 330 the determination may again be made if a credit report was located. Periodic requests may be made for a predetermined amount of time, for example a year, or a predetermined number of times, such as 10 times, or they may be made as long as requested by the consumer.

In block 350, if a credit report has been located for the consumer, the enrollment of the consumer in a credit monitoring service continues. In one embodiment, the credit report monitoring system 170 continues the enrollment of the consumer after receiving a credit report and/or a notification that a credit report exists. A credit report for the consumer may be located in response to the first request for a credit report, for example, or may be located a day later, a month later, a year later, or any other period of time later.

Figure 4:
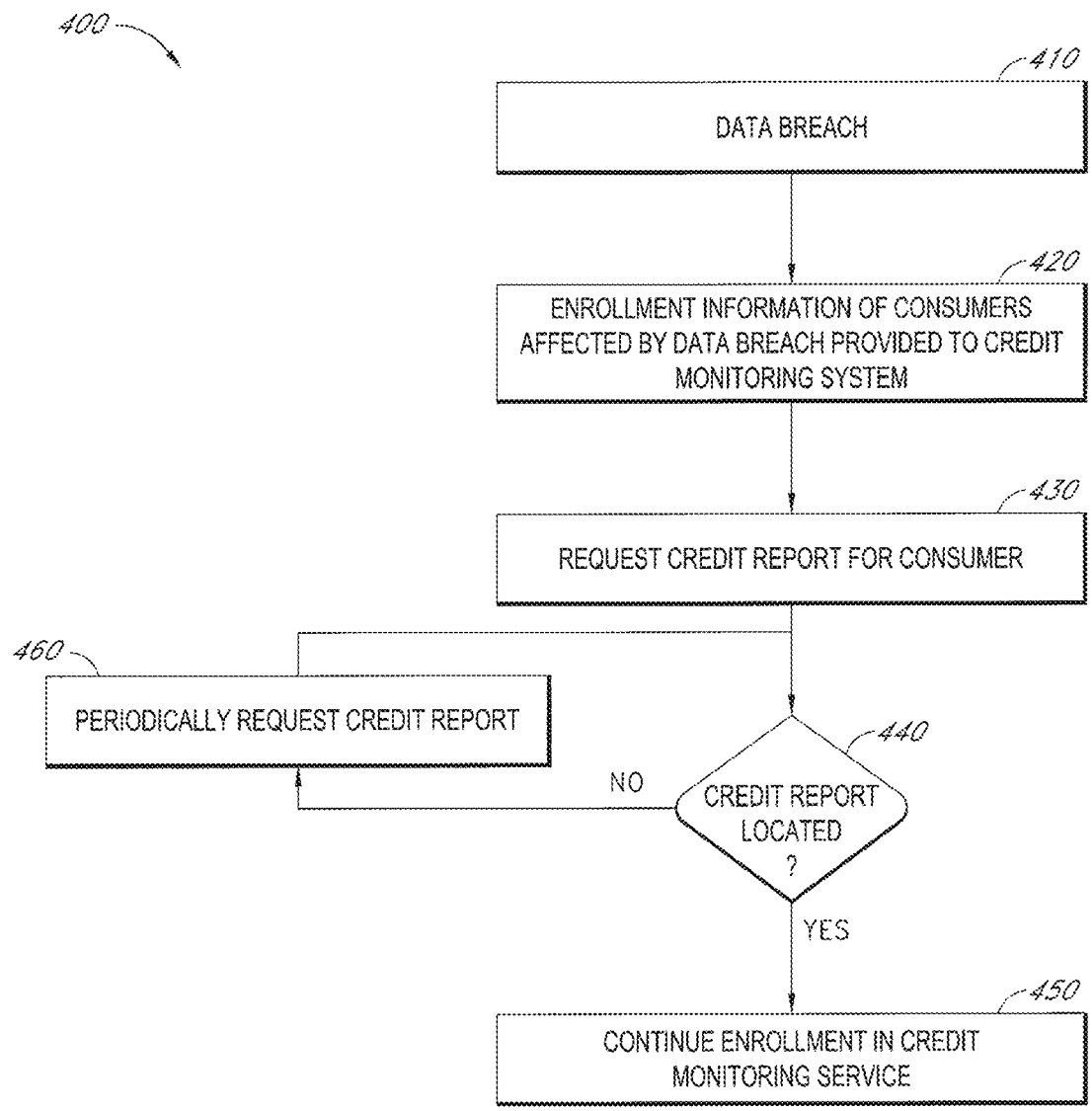
FIG. 4 is a flowchart illustrating another embodiment of a method of enrolling a consumer in a credit report monitoring service.

FIG. 4 is a flowchart 400 illustrating another embodiment of a method of enrolling a consumer 130 (e.g., FIG. 1A) in a credit report monitoring service. Certain blocks of the flowchart may be performed by the credit report monitoring system 170, the report existence system 150, and/or any other suitable computing device. Depending on the embodiment, the method of FIG. 4 may include fewer or additional blocks and the blocks may be performed in an order that is different than illustrated in FIG. 4.

Beginning in block 410, a data breach occurs. In one embodiment, the data breach involves the theft or loss of data that includes personally identifiable information. The entity whose data is breached may be any entity that stores the personal information of consumers, including, for example, businesses, non-profit organizations, schools, churches, civic groups, government organizations, and health care providers. The data may be stored on any medium, including digital media, such as hard drives, USB jump drives, optical storage devices, lap tops, computer tapes, or diskettes. Alternatively, the data may be intercepted while being transmitted via a network, such as one or more of the following: LANs, WANs, MANs, or the Internet, or the data may be acquired over a network by defeating or circumventing security measures of a device that is configured to store data on digital media and communicate with the network. In other embodiments, the data breach may involve the theft or other loss of data that is stored on non-digital records, such as paper records.

The breached personal information may include, any information regarding a consumer, such as, for example, name, maiden name, signature, Social Security number, address, phone number, date of birth, credit card number(s), debit card number(s), bank account number(s), other account numbers, identification number(s), names of family members, academic records, credit score, and/or medical records.

In block 420, the enrollment information of consumers 130 affected by the data breach is provided to the monitoring system 170. In one embodiment, the consumer 130 provides the enrollment information to the monitoring system 170, such as via a web interface or a telephone. In other embodiments, the entity whose data was breached may provide the enrollment information of the consumer 130 to the credit report monitoring system 170. In some embodiments, the entity whose data was breached may pay a fee associated with enrollment. Depending on the embodiment, the credit report monitoring system 170 may be a part of or affiliated with a credit bureau 140.

In block 430, a request is made for a credit report for a consumer. In one embodiment, the credit report monitoring system 170 sends a request for the credit report to one or more credit bureaus 140. Depending on the embodiment, the credit monitoring system 170 may include a report existence system 150 (e.g., FIG. 1A), which sends the request for the credit report to the one or more credit bureaus 140.

In block 440, a determination is made if a credit report was found for the consumer. For example, the monitoring system 170 may determine if the one or more credit bureaus 140 returned a credit report for the consumer 130. In one illustrative embodiment, the monitoring system 170 may determine that a credit report was found if a credit report or an indication of the availability of a credit report was returned by the one or more credit bureaus 140.

If no credit report if found in block 440, in block 460 periodic request for a credit report are made. In one exemplary embodiment, the report existence system 150 periodically sends a request to one or more credit bureaus 140 for a credit report of the consumer 130. The period may be one hour, a day, two days, one week, two weeks, one month, or any other period. In one embodiment, the frequency at which credit reports for a consumer is requested changes over time, such as requesting credit reports daily for a first few days, then weekly for a few weeks, and then monthly until a credit report is found or the periodic requests are discontinued. Upon receiving the response of the credit bureau 140 to the periodic request for a credit report, the method may return to block 440 to determine if a credit report was located.

In block 450, the enrollment of the consumer 130 in a credit report monitoring service is continued. In one embodiment, all of the remaining enrollment information from the consumer 130 has already been received by a credit report monitoring system 170, for example when the consumer 130 initially attempted to enroll in the credit monitoring service, and the credit monitoring service 170 may continue enrollment of the consumer 130 in the credit monitoring service without further communication with the consumer 130. In other embodiments the credit report monitoring system 170 may need to acquire at least some enrollment information from the consumer 130 prior to or as a part of completing enrollment.

Figure 5:
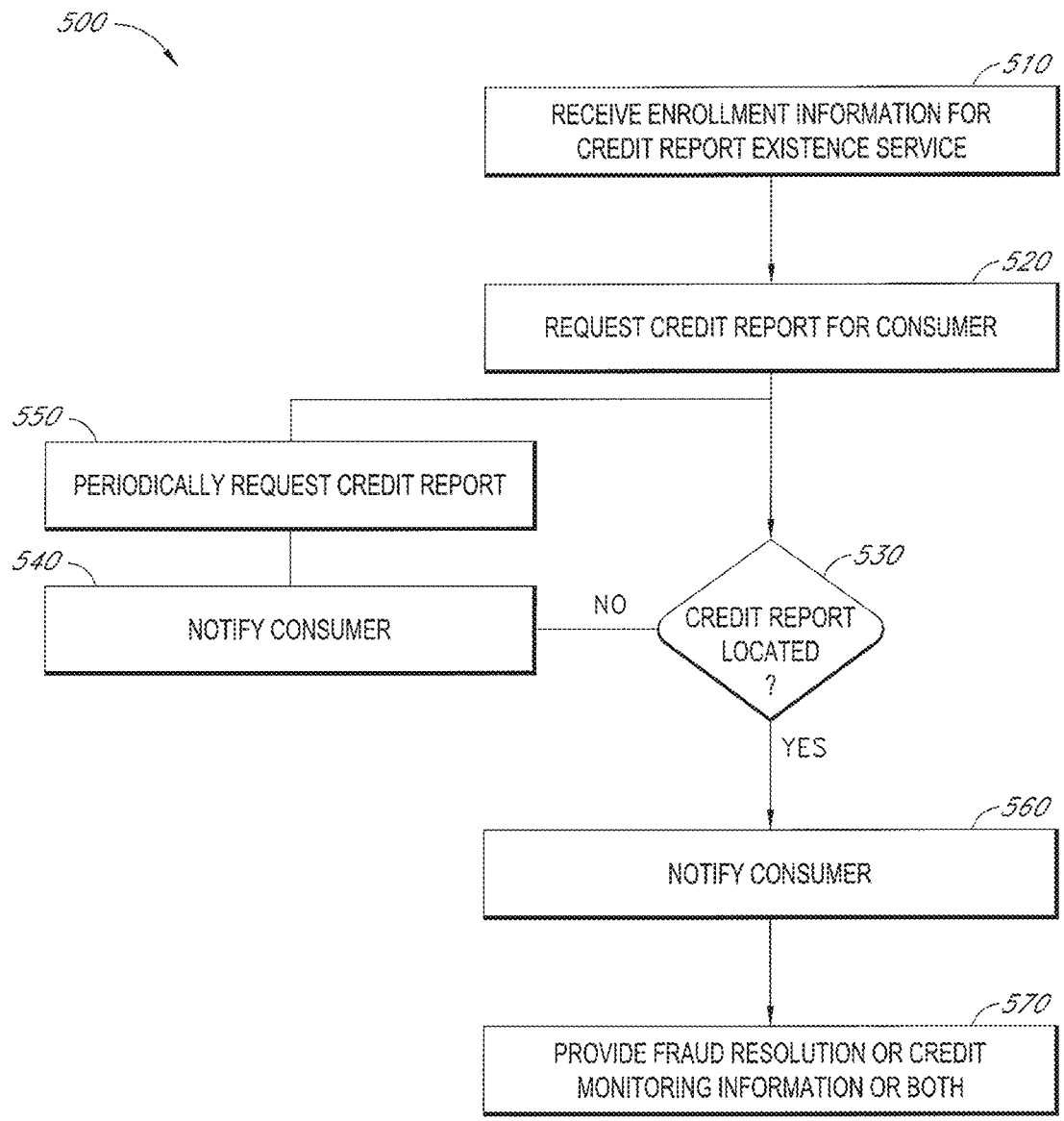
FIG. 5 is a flowchart illustrating one embodiment of a method of monitoring the existence of a credit report for a consumer.

FIG. 5 is a flowchart 500 illustrating one embodiment of a method of monitoring the existence of a credit report for a consumer 130. The exemplary method illustrated in FIG. 5 may be performed, for example, for consumers who would like to monitor the non-existence of a credit report. Certain blocks of the flowchart may be performed by the credit report monitoring system 170, the report existence system 150, and/or any other suitable computing device. Depending on the embodiment, the method of FIG. 5 may include fewer or additional blocks and the blocks may be performed in a different order than is illustrated.

In block 510, enrollment information for a credit report existence service is received. The enrollment information may be received, for example, by a report existence system 150, a credit monitoring system 170, and/or a credit bureau 140. In one embodiment, the consumer 130 may supply the enrollment information, and in other embodiments, an entity whose data has been breached may provide the enrollment information.

In block 520, a request is sent to one or more credit bureaus 140 for a credit report for a consumer, using any of the means explained above. In one exemplary embodiment, the request is sent by a report existence system 150.

In block 530, the credit report existence system, for example, determines if a credit report is located. In one embodiment, the report existence system 150 determines if the credit bureau 140 located or returned a credit report for the consumer 130.

In block 540, if the response of the credit bureau 140 indicates that no credit report for the consumer 130 was located and/or available, the consumer may be notified that no credit report has been located. The notification may be sent by the report existence system 150, the credit report monitoring system 170, and/or the credit bureau 140. A consumer may be notified after each determination is made that a credit report is located, after a predetermined subset of determinations, or according to a periodic schedule, for example each month. In other embodiments, consumers may not be notified if no credit report is located. In block 550 periodic requests for a credit report are transmitted to one or more credit bureaus 140. In some embodiments, blocks 530, 540, and 550 are repeated until a credit report for the consumer is located.

In block 560, when a credit report has been located for a consumer, the consumer 130 is notified that a credit report was located. The notification may include a copy of the credit report. In block 570, the consumer 130 may be provided with information regarding fraud resolution and/or credit monitoring services. In other embodiments, the consumer 130 may be provided the information via a web page or via first person contact. In one embodiment, the fraud resolution services or credit monitoring services or both services are offered by a credit bureau, such as Experian, TransUnion, Equifax, or any agency thereof.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A non-transitory computer readable medium storing computer executable instructions that, when executed by one or more processors, cause the one or more processors to perform operations comprising:
   receiving an indication of a data breach;
   receiving enrollment information from a plurality of consumers subject to the data breach to enroll into a credit monitoring service;
   requesting credit reports relating to the plurality of consumers subject to the data breach;
   receiving a first set of credit reports for a first subset of the plurality of consumers from a first credit bureau;
   determining that (a) the first subset of the plurality of consumers each have a credit file, and (b) a second subset of the plurality of consumers each do not have a credit file;
   receiving authorization from at least one of the second subset of the plurality of consumers to monitor for the existence of a credit file associated with the at least one of the second subset of the plurality of consumers; and
   for the at least one of the second subset of the plurality of consumers that do not have a credit file:

on a periodic basis, transmitting a request for a credit report for the at least one of the second subset of the plurality of consumers;
identifying a credit report of an individual consumer of the second subset; and
completing enrollment of the individual consumer in the credit monitoring service based on the received enrollment information corresponding to the individual consumer, wherein the credit monitoring service is configured to notify the individual consumer of changes between a first credit report of the individual consumer obtained by the credit monitoring service at a first time and a second credit report of the individual consumer obtained by the credit monitoring service at a second time.

2. The non-transitory computer readable medium of claim 1, wherein the data breach includes a theft or loss of data.

3. The non-transitory computer readable medium of claim 1, wherein:
for each individual consumer of the first subset of the plurality of consumers, the operations further comprise:
periodically requesting a credit report for the individual consumer of the first subset of the plurality of consumers associated with the data breach from the first credit bureau;
receiving an updated credit report for the individual consumer of the first subset associated with the data breach from the first credit bureau;
comparing the updated credit report with an earlier credit report, from the first set of credit reports, for the individual consumer of the first subset;
identifying a change in the updated credit report and the earlier credit report in the first set of credit reports based on the comparison; and
initiating display of a user interface including a limited subset of data related to the change and a selectable link.

4. The non-transitory computer readable medium of claim 3, wherein the user interface includes:
a limited subset of data of the updated credit report or the earlier credit report in the first set of credit reports that have the identified change; and
the selectable link to be displayed on a webpage, wherein the selectable link is configured to launch a user interface that displays additional information regarding the identified change.

5. The non-transitory computer readable medium of claim 3, wherein the change is related to at least one of: a bank account, a loan, a credit card account, or a telephone number.

6. The non-transitory computer readable medium of claim 3, wherein initiating display of the user interface is in response to identifying a particular change between the earlier credit report and the updated credit report.

7. The non-transitory computer readable medium of claim 1, wherein the credit monitoring service cannot be performed for a particular individual without a pre-existing credit file existing for the particular individual.

8. The non-transitory computer readable medium of claim 1, wherein the credit monitoring service further notifies the individual consumer of one or more detected activities that are indicative of fraud or potential fraud.

9. A computer-implemented method comprising:
receiving an indication of a data breach;
receiving enrollment information from a plurality of consumers subject to the data breach to enroll into a credit monitoring service;
requesting credit reports relating to the plurality of consumers subject to the data breach;
receiving a first set of credit reports for a first subset of the plurality of consumers from a first credit bureau;
determining that (a) the first subset of the plurality of consumers each have a credit file, and (b) a second subset of the plurality of consumers each do not have a credit file;
receiving authorization from at least one of the second subset of the plurality of consumers to monitor for the existence of a credit file associated with the at least one of the second subset of the plurality of consumers; and
for the at least one of the second subset of the plurality of consumers that do not have a credit file:
on a periodic basis, transmitting a request for a credit report for the at least one of the second subset of the plurality of consumers;
identifying a credit report of an individual consumer of the second subset; and
completing enrollment of the individual consumer in the credit monitoring service based on the received enrollment information corresponding to the individual consumer, wherein the credit monitoring service is configured to notify the individual consumer of changes between a first credit report of the individual consumer obtained by the credit monitoring service at a first time and a second credit report of the individual obtained by the credit monitoring service at a second time.

10. The computer-implemented method of claim 9, wherein the user interface is viewable in a web browser.

11. The computer-implemented method of claim 9, further comprising notifying the consumer when the first credit report of the individual is received.

12. A system comprising:
a memory; and
a processor configured to:
receive an indication of a data breach;
receive enrollment information from a plurality of consumers subject to the data breach to enroll into a credit monitoring service;
request credit reports relating to the plurality of consumers subject to the data breach;
receive a first set of credit reports for a first subset of the plurality of consumers from a first credit bureau;
determine that (a) the first subset of the plurality of consumers each have a credit file, and (b) a second subset of the plurality of consumers each do not have a credit file;
receive authorization from at least one of the second subset of the plurality of consumers to monitor for the existence of a credit file associated with the at least one of the second subset of the plurality of consumers; and
for the at least one of the second subset of the plurality of consumers that do not have a credit file:
on a periodic basis, transmit a request for a credit report for the at least one of the second subset of the plurality of consumers;
identify a credit report of an individual consumer of the second subset; and
complete enrollment of the individual consumer in the credit monitoring service based on the received enrollment information corresponding to the individual consumer, wherein the credit monitoring service is configured to notify the individual consumer of changes between a first credit report of the individual consumer obtained by the credit monitoring service at a first time and a second credit report of the individual obtained by the credit monitoring service at a second time.

13. The system of claim 12, wherein the processor is further configured to notify the consumer when the first credit report of the individual is received.

14. The system of claim 12, wherein for each individual consumer of the first subset of the plurality of consumers, the processor is further configured to:
periodically request a credit report for the individual consumer of the first subset of the plurality of consumers associated with the data breach from the first credit bureau;
receive an updated credit report for the individual consumer associated with the data breach from the first credit bureau;
compare the updated credit report with an earlier credit report for the individual consumer in the first set of credit reports;
identify a change in the updated credit report and the earlier credit report in the first set of credit reports based on the comparison; and
initiate display of a user interface including a limited subset of data related to the change and a selectable link.

15. The system of claim 14, wherein the user interface includes:
a limited subset of data of the updated credit report or the earlier credit report in the first set of credit reports that have the identified change; and
the selectable link to be displayed on a webpage, wherein the selectable link is configured to launch a user interface that displays additional information regarding the identified change.

16. The system of claim 14, wherein to initiate display of the user interface is in response to identifying a particular change between the earlier credit report and the updated credit report.

17. The system of claim 14, wherein initiating display of the user interface comprises transmitting user interface data to a computing device of the individual.

18. The system of claim 12, wherein the credit monitoring service cannot be performed for a particular individual without a pre-existing credit file existing for the particular individual.

19. The system of claim 12, wherein the credit monitoring service further notifies the individual consumer of one or more detected activities that are indicative of fraud or potential fraud.

* * * * *